(12) United States Patent  (10) Patent No.: US 7,780,188 B2
Eckert et al.  (45) Date of Patent: Aug. 24, 2010

(54) AIRBAG MODULE FOR A MOTOR VEHICLE

(75) Inventors: Nick Eckert, Berlin (DE); Matthias Liebetrau, Falkensee (DE); Patrick Isermann, Berlin (DE); Rafael Fagir, Berlin (DE)

(73) Assignee: Takata - Petri AG, Aschaffenburg (DE)

( * ) Notice: Subject to any disclaimer, the term of this patent is extended or adjusted under 35 U.S.C. 154(b) by 0 days.

(21) Appl. No.: 12/010,069

(22) Filed: Jan. 18, 2008

(65) Prior Publication Data

US 2008/0111351 A1 May 15, 2008

Related U.S. Application Data

(63) Continuation of application No. PCT/DE2006/001110, filed on Jun. 19, 2006.

(30) Foreign Application Priority Data

Jul. 21, 2005 (DE) ........................ 20 2005 011 878

(51) Int. Cl.
*B60R 21/20* (2006.01)
(52) U.S. Cl. ................................... 280/728.2
(58) Field of Classification Search ............... 280/728.3
See application file for complete search history.

(56) References Cited

U.S. PATENT DOCUMENTS

| | | | | |
|---|---|---|---|---|
| 4,348,037 A | * | 9/1982 | Law et al. | 280/733 |
| 4,793,631 A | * | 12/1988 | Takada | 280/728.2 |
| 5,064,218 A | * | 11/1991 | Hartmeyer | 280/728.2 |
| 5,118,133 A | * | 6/1992 | Zushi et al. | 280/728.2 |
| 5,131,677 A | * | 7/1992 | Horiuchi et al. | 280/731 |
| 5,423,568 A | * | 6/1995 | Zushi et al. | 280/728.2 |
| 5,490,690 A | * | 2/1996 | Mihm | 280/728.2 |
| RE35,265 E | * | 6/1996 | Baker | 493/405 |
| 5,542,692 A | * | 8/1996 | Shaklik et al. | 280/728.2 |
| 5,613,698 A | * | 3/1997 | Patercsak et al. | 280/728.1 |
| 5,615,910 A | * | 4/1997 | Margetak et al. | 280/731 |
| 5,658,008 A | * | 8/1997 | Herrmann et al. | 280/728.2 |
| 5,673,930 A | * | 10/1997 | Coleman | 280/728.2 |
| 5,806,882 A | * | 9/1998 | Stein et al. | 280/730.2 |
| 6,129,377 A | * | 10/2000 | Okumura et al. | 280/730.2 |
| 6,250,665 B1 | * | 6/2001 | Sutherland et al. | 280/728.2 |

(Continued)

FOREIGN PATENT DOCUMENTS

DE 91 01 099 U1 7/1992

(Continued)

*Primary Examiner*—Paul N Dickson
*Assistant Examiner*—Laura Freedman
(74) *Attorney, Agent, or Firm*—Foley and Lardner LLP

(57) ABSTRACT

An airbag module for a motor vehicle, including an airbag folded to form an airbag package; a component of the airbag module, which via a first component part for inflating the airbag with gas and/or for fastening the airbag to a motor vehicle part cooperates with the airbag; and a protective covering which encloses the airbag in a gastight manner. The protective covering also encloses the first component part and comprises at least one opening, through which a second component part connected to the first component part projects from the space enclosed by the protective covering, the opening of the protective covering being closed in a gastight manner by means of a sealing element.

78 Claims, 11 Drawing Sheets

U.S. PATENT DOCUMENTS

| | | | |
|---|---|---|---|
| 6,398,255 B1 * | 6/2002 | Scherzinger et al. | 280/731 |
| 6,592,141 B1 * | 7/2003 | Dancasius et al. | 280/728.2 |
| 7,384,064 B2 * | 6/2008 | Thomas et al. | 280/731 |
| 2002/0135160 A1 | 9/2002 | Lorenz | |
| 2005/0067209 A1 * | 3/2005 | Yoshikawa et al. | 180/271 |
| 2005/0104336 A1 * | 5/2005 | Schneider et al. | 280/728.2 |

FOREIGN PATENT DOCUMENTS

| | | |
|---|---|---|
| DE | 197 18 211 A1 | 11/1998 |
| DE | 101 14 208 A1 | 5/2002 |
| DE | 20 2004 000 171 U1 | 4/2004 |
| DE | 10 2004 056 128 A1 | 1/2007 |
| EP | 0 875 425 A2 | 11/1998 |
| GB | 2265581 A * | 10/1993 |
| GB | 2272189 A * | 5/1994 |
| JP | 4-146840 A | 5/1992 |
| JP | 10-181493 A | 7/1998 |

* cited by examiner

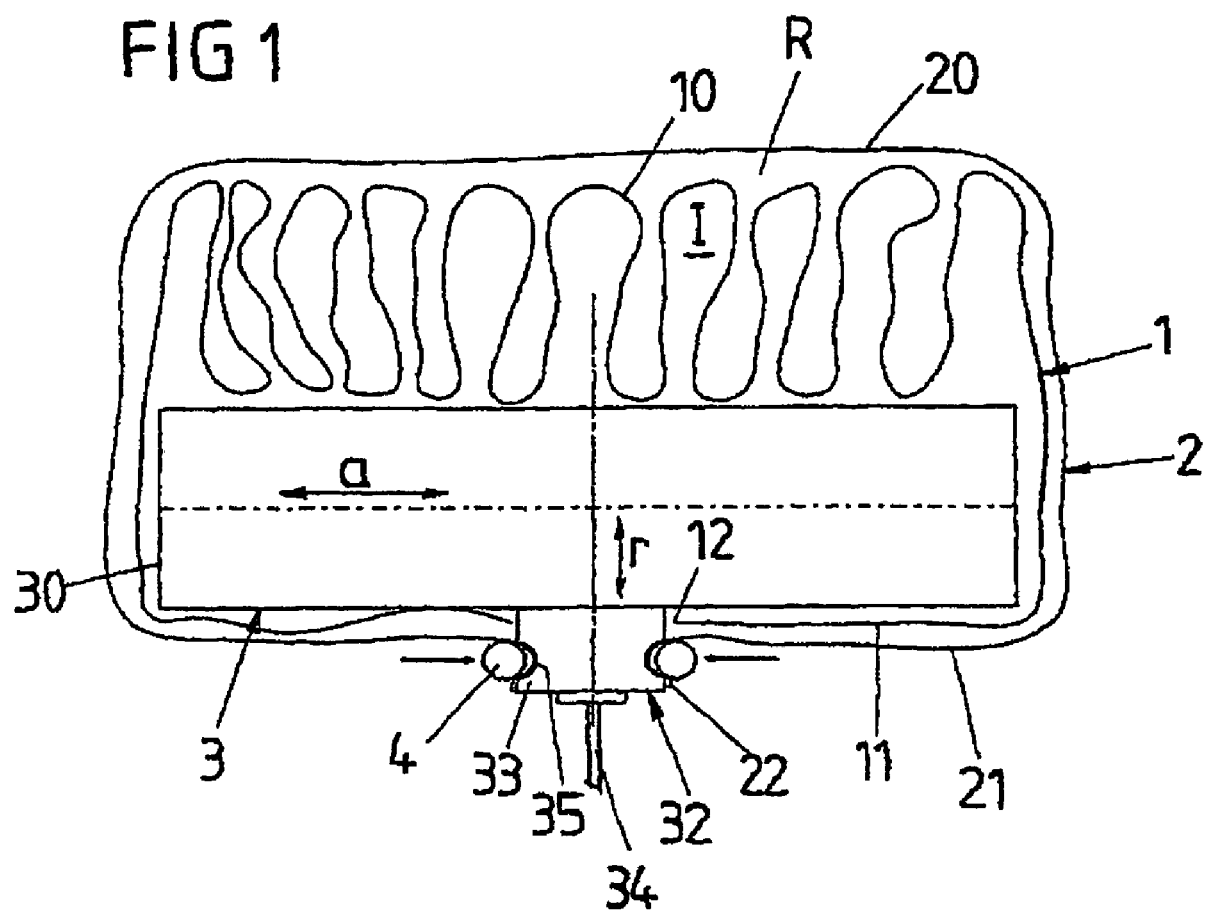

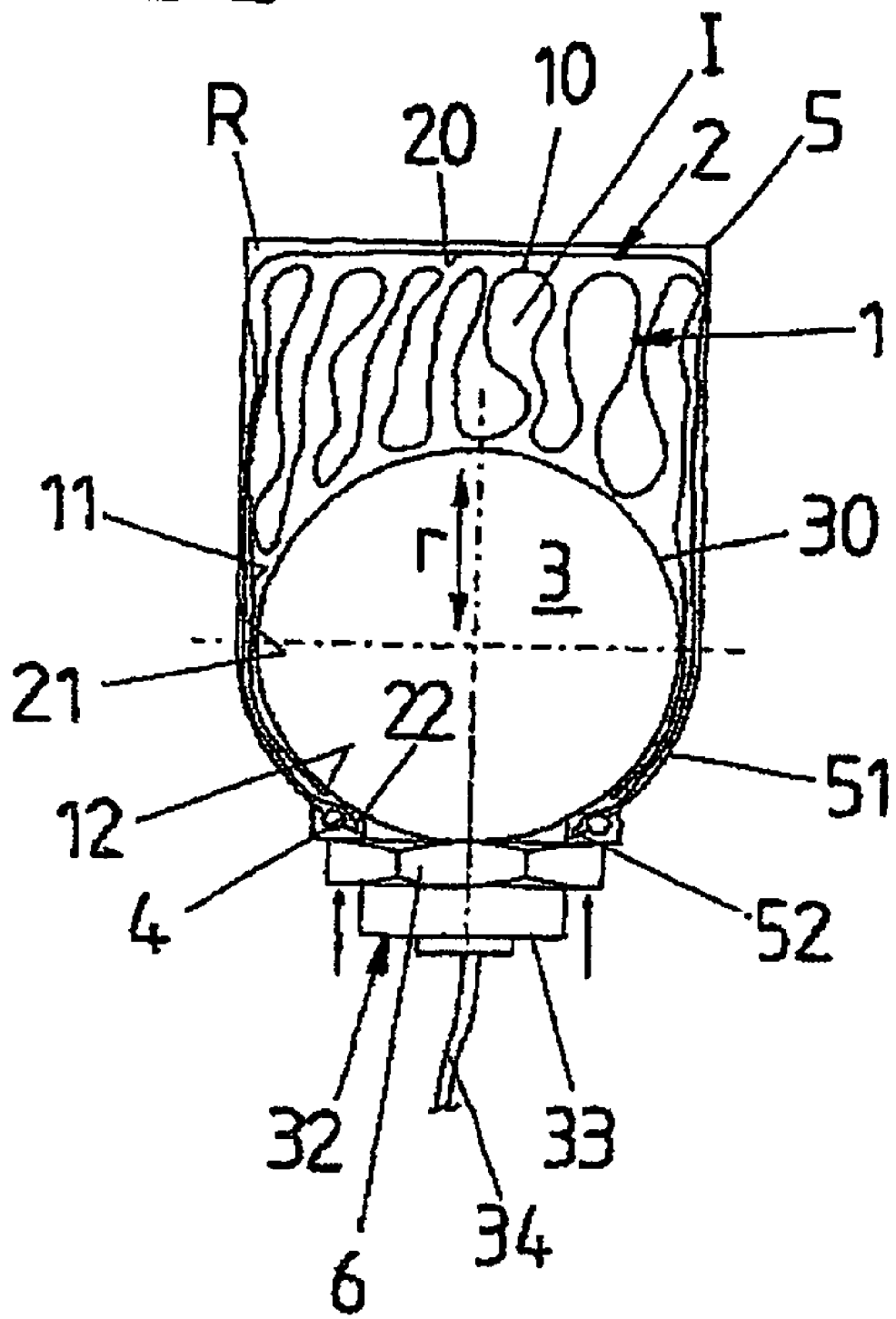

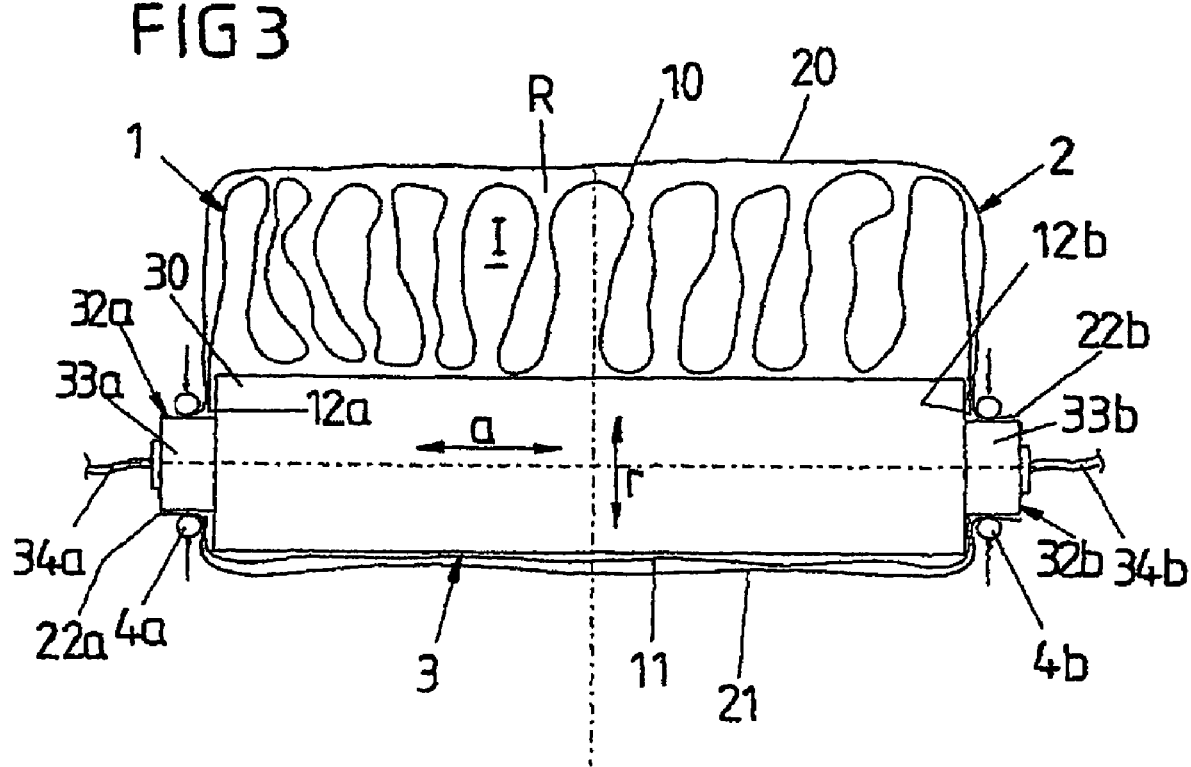

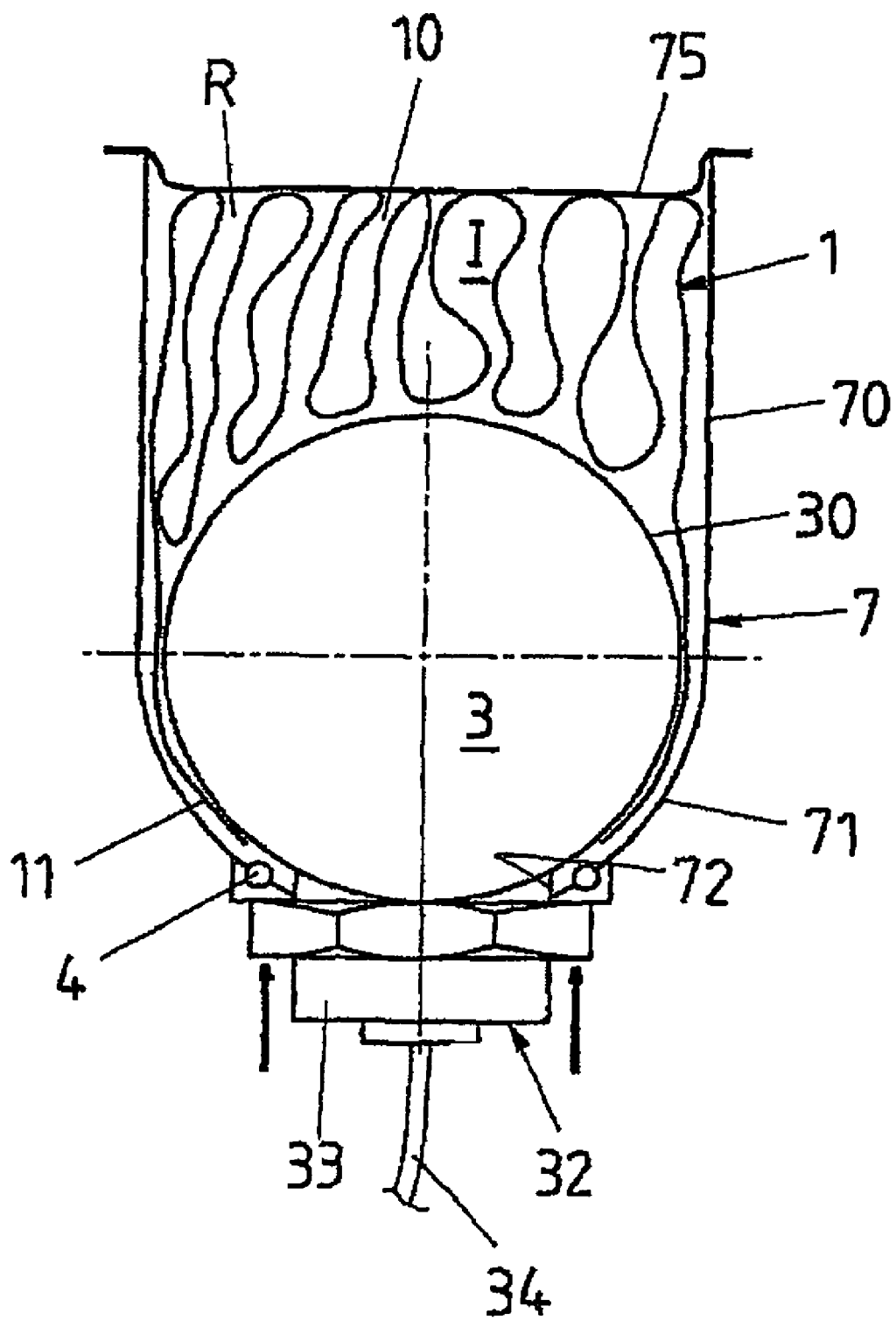

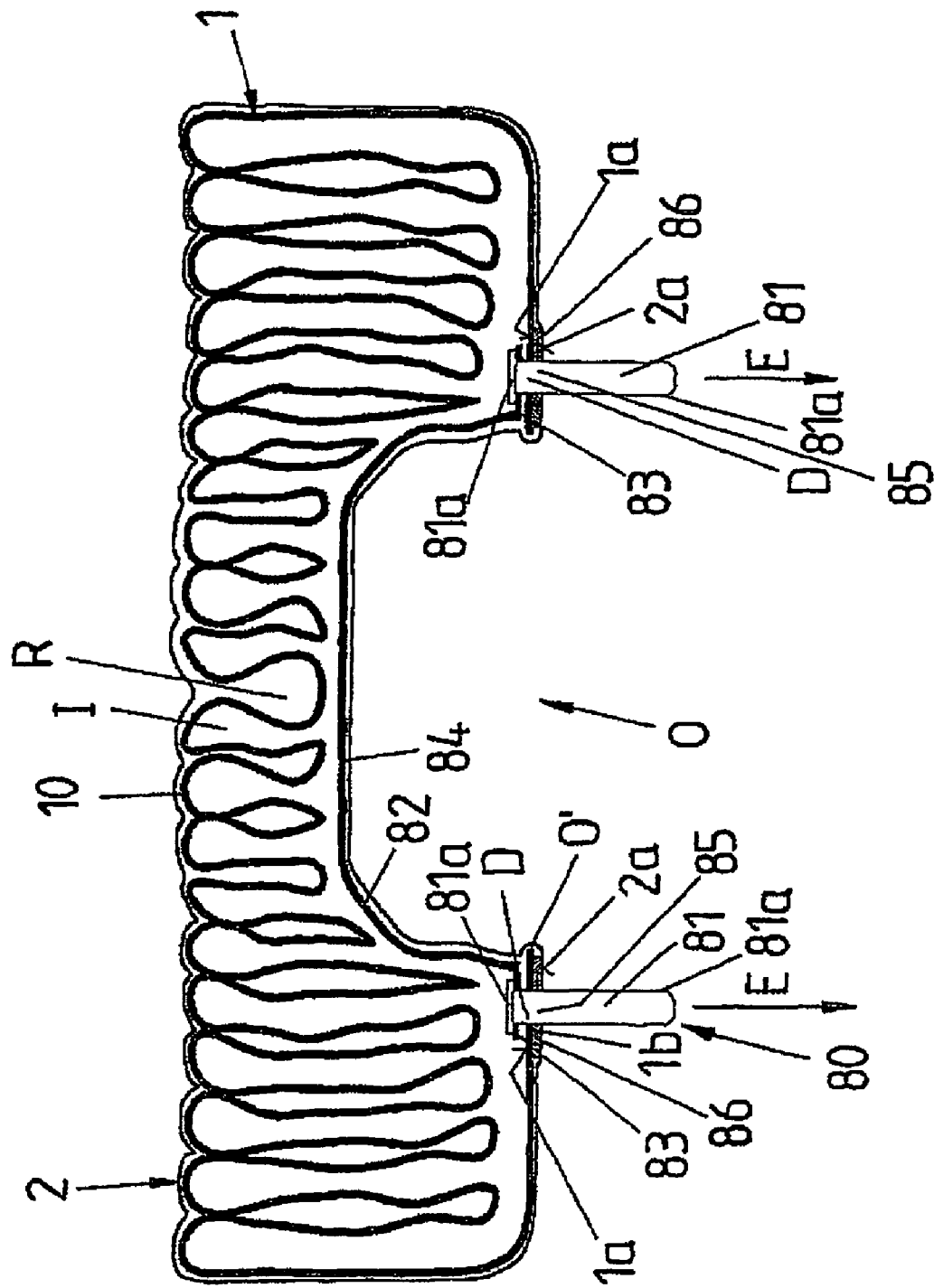

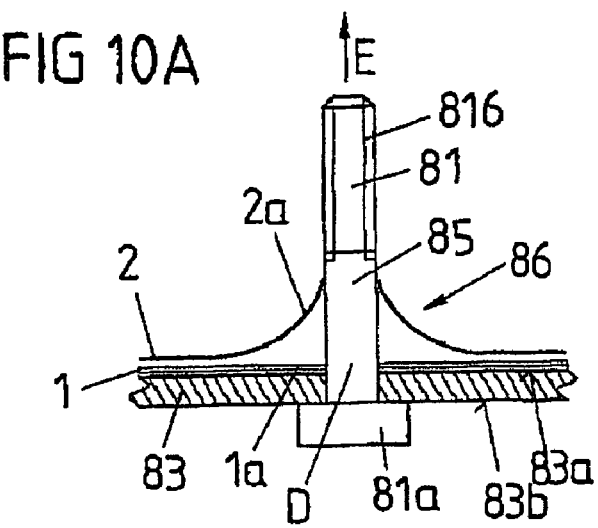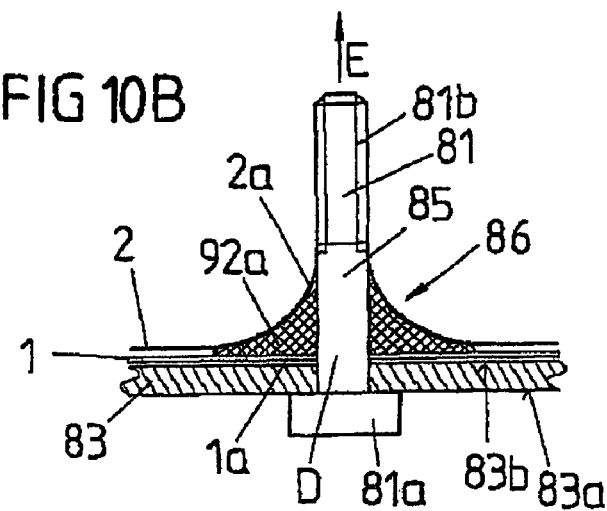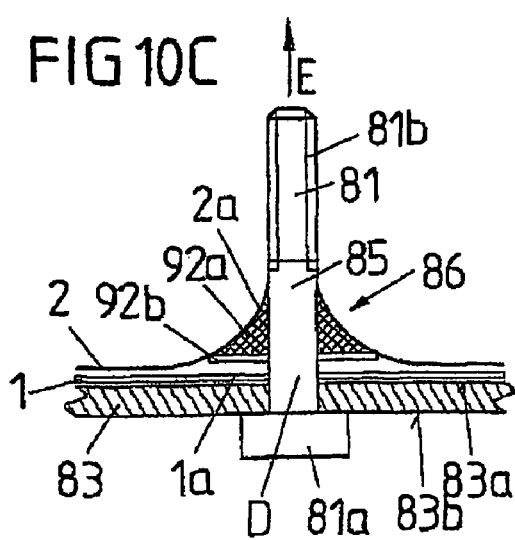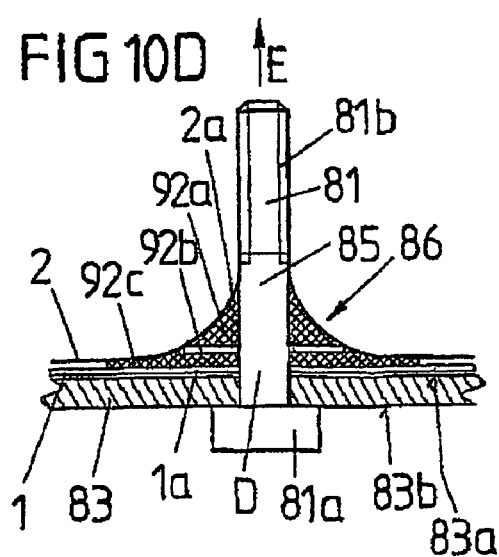

AIRBAG MODULE FOR A MOTOR VEHICLE

CROSS REFERENCE TO RELATED APPLICATIONS

This application is a Continuation of US Application PCT/DE2006/001110, filed Jun. 19, 2006, which is incorporated herein by reference in its entirety. This International Application was not published in English but was published in German as WO 2007/009416.

BACKGROUND

The invention relates to an airbag module for a motor vehicle.

Such an airbag module comprises an airbag which is folded to form an airbag package, a component of the airbag module cooperating with the airbag, which serves for fastening and/or inflating the airbag with gas, the component comprising a first component part via which the component cooperates with the airbag. Such an airbag module further comprises a protective covering which encloses the airbag in a gastight manner. This allows the airbag to be folded and/or gathered to form a particularly compact airbag package under the action of a vacuum and a subsequent retaining of the folded airbag package in extremely compact form by the airbag package being received in the protective covering in a gastight manner. Said protective covering may be, in particular, a film-like, flexible protective covering which is able to enclose the airbag package in a manner in which it bears tightly thereagainst.

SUMMARY

One embodiment relates to an airbag module for a motor vehicle, including an airbag folded to form an airbag package; a component of the airbag module, which via a first component part for inflating the airbag with gas and/or for fastening the airbag to a motor vehicle part cooperates with the airbag; and a protective covering which encloses the airbag in a gastight manner. The protective covering also encloses the first component part and comprises at least one opening, through which a second component part connected to the first component part projects from the space enclosed by the protective covering, the opening of the protective covering being closed in a gastight manner by means of a sealing element.

BRIEF DESCRIPTION OF THE DRAWINGS

Further details and advantages of the invention will become clear from the following description of embodiments with reference to the figures, in which:

FIG. 1 is a cross-section view of a first embodiment of an airbag module with a gas generator arranged inside an airbag folded to form an airbag package and a flexible protective covering surrounding the gas package and the gas generator;

FIG. 2 is a cross-section view of an airbag module according to another exemplary embodiment;

FIG. 3 is a cross-section view of an airbag module according to another exemplary embodiment;

FIG. 4 is a cross-section view of an airbag module according to another exemplary embodiment;

FIG. 5 is a cross-section view of an airbag module according to another exemplary embodiment with an airbag folded to form an airbag package, which is tightly enclosed by a protective covering, and a diffuser arranged inside the airbag, with a bearing region for bearing against an edge region bordering an inlet opening of the airbag, a plurality of pins projecting from the bearing region which are passed through through-openings of the airbag and openings of the protective covering aligned with said through-openings and thus project from a space surrounded by the protective covering;

FIGS. 10A-10D are cross-sections of a fastening mechanism for the airbag module of FIG. 5 according to several exemplary embodiments, an edge region of the protective covering surrounding the opening being configured as a sealing element for sealing the opening of the protective covering penetrated by the second component part of the fastening mechanism;

DETAILED DESCRIPTION

Figure 6A:
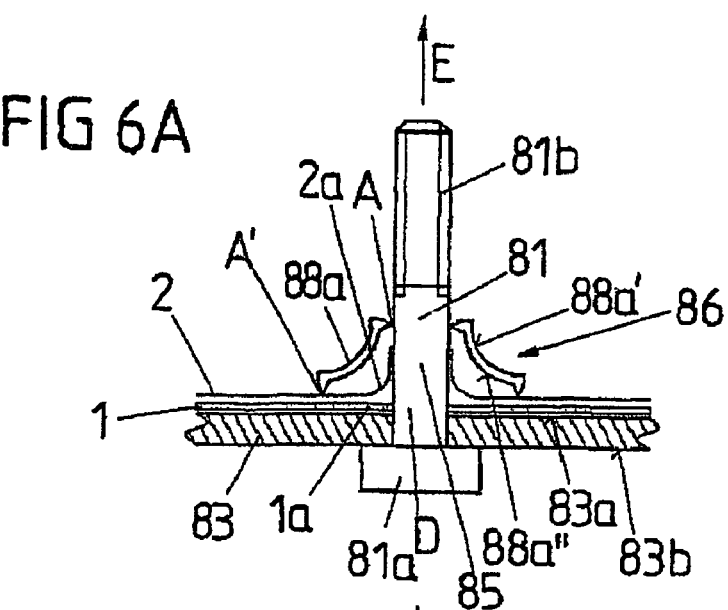
FIGS. 6A-6C are cross-sections of a fastening mechanism for the airbag module of FIG. 5 according to several exemplary embodiments, with a first component part which comprises a bearing region and a second component part in the form of a pin projecting from the first component part, which is passed in the direction of extension through a through-opening of a part of an airbag bearing against the bearing region and through an opening of the protective covering corresponding to said through-opening, so that it projects from the space surrounded by the protective covering, a self-locking sealing element being provided for closing the opening of the protective covering in a gastight manner.

According to one exemplary embodiment, an airbag module that includes an airbag which is folded to form an airbag package, a component of the airbag module cooperating with the airbag, which serves for fastening and/or inflating the airbag with gas, the component comprising a first component part via which the component cooperates with the airbag. Such an airbag module further comprises a protective covering which encloses the airbag in a gastight manner. This allows the airbag to be folded and/or gathered to form a particularly compact airbag package under the action of a vacuum and a subsequent retaining of the folded airbag package in extremely compact form by the airbag package being received in the protective covering in a gastight manner. Said protective covering may be, in particular, a film-like, flexible protective covering which is able to enclose the airbag package in a manner in which it bears tightly thereagainst.

It is provided that the protective covering also encloses the first component part and comprises at least one opening, through which a second component part projects from the space enclosed by the protective covering, the opening of the protective covering being closed in a gastight manner by means of a sealing element.

A sealing device is understood in the present case by the term "sealing element", which seals the opening in the protective covering serving to pass through the second component part in a gastight manner, said sealing element not having to be necessarily configured in one piece but also being able to consist of a plurality of individual sealing parts.

The solution according to the invention has the advantage that the component may be partially moved out of the space surrounded by the protective covering, without, as a result, the vacuum prevailing in the space being lost. The size of the package of the airbag package which is advantageously small as a result of the vacuum, is thus maintained. For sealing the opening provided in the protective covering, the sealing element preferably extends in the manner of a sealing ring along the edge of said opening and advantageously consists of an elastic material so that it may bear sealingly against a (substantially dimensionally stable) support region of the airbag module and may be pretensioned thereagainst.

According to another embodiment, the sealing element is formed from at least partially, preferably entirely, of a thermoplastic material. With a multipart sealing element, the sealing element may comprise a sealing mechanism which is made from a thermoplastic material. The thermoplastic sealing element and/or sealing mechanism is thus arranged at the opening of the protective film, so that, when heated, it melts with the protective covering and closes the opening of the protective covering in a gastight manner.

In one embodiment of the invention, the component of the airbag module is configured as a gas generator for inflating the airbag. The gas generator may be a cold gas generator, in the first component part thereof which is configured as a generator body a gas being stored which is released when igniting the gas generator, or the gas generator may be a so-called hot generator which contains chemical substances and/or compounds which generate the gas to be released, only after igniting the gas generator. Moreover, said gas generator may be a so-called hybrid gas generator in which, on the one hand, the gas is stored and which, on the other hand, contains a chemical compound for generating additional hot gases. The igniting of the gas generator generally takes place electrically via an electric cable connected to the igniter.

Preferably, the second component part is configured as an ignition device of the gas generator which may be actuated for igniting the gas generator.

With a component of the airbag module, configured as a gas generator, it is advantageously not necessary to destroy a flexible or other protective covering of the airbag when igniting the gas generator to allow the gases discharging from the gas generator into the airbag to be inflated, as the generator body (first component part) is arranged inside the space surrounded by the protective covering, so that, in particular, damaging emissions and the formation of damaging particles as a result of thermal destruction of the protective covering by hot gases may be avoided.

The invention allows the combination of modular designs in which the gas generator is arranged inside the airbag (i.e. is enclosed by the airbag) with modular designs in which the airbag folded to form an airbag package has been folded into a particularly small package size by a vacuum and therefore said package size is maintained by a gastight (flexible) protective covering enclosing the airbag.

The support region against which the sealing element bears is preferably configured on the gas generator itself, in particular on the gas generator body and/or on an igniter of the ignition device, advantageously engaging around said gas generator and/or igniter. The airbag folded to form an airbag package comprises a through-opening corresponding to the opening in the protective covering, through which the ignition device and, if necessary, parts of the gas generator project from the airbag. If the gas generator is, for example, a tubular generator extending longitudinally, the igniter may project in the radial direction of the peripheral surface thereof or may project in the axial direction from at least one front face of the gas generator. For example, two igniters may also be provided which project in the axial direction from one respective front face of the gas generator.

The protective covering surrounding the airbag and the gas generator is preferably configured at least partially as a (film-like) flexible protective covering. The protective covering may be entirely formed by a flexible protective covering or may be formed by a housing-like, possibly elastically deformable covering in combination with a flexible protective covering). With such a combination, the flexible protective covering serves to cover a top surface of the housing-like component part of the protective covering.

Provided that the opening of the protective covering, through which the ignition device projects, is configured on a flexible or at least an elastically deformable component of the protective covering, the sealing element may serve to distort the edge of the opening of the protective covering against an associated support region of the module, in order to close the openings in a gas-impermeable manner.

Provided that a housing is associated with the airbag module, which at least partially surrounds the gas generator, the airbag, as well as the flexible protective covering, said housing may also comprise an opening through which the ignition device, i.e. the igniter or ignition cable thereof, is passed. The sealing element may be arranged on the module housing.

In a further embodiment of the invention, the component of the airbag module cooperating with the airbag is configured as a fastening mechanism to couple the airbag to a motor vehicle part. It is naturally also possible that the component of the airbag module is configured as a gas generator which is simultaneously configured to couple the airbag to a motor vehicle part (or a support of the airbag module). As a result of the sealing element which seals the opening of the protective covering penetrated by the second component part of the fastening mechanism, the gastightness of the protective covering is ensured, i.e. no air is able to penetrate from outside into the space surrounded by the protective covering and disadvantageously affect the advantageously small package size of the airbag package.

The fastening mechanism advantageously allows a fastening of the airbag package to a support in which the fastening mechanism does not have to engage around the airbag package in cross section, so that the deployment of the airbag is not impaired when inflated.

Preferably, the fastening mechanism is fastened to the airbag via the first component part of the component of the airbag module, configured as a fastening mechanism, for example by clamping a region of the airbag to the first component part.

The second component part of the fastening mechanism connected integrally in particular to the first component part preferably serves for fastening the fastening mechanism to a support of the airbag module, for example a motor vehicle part.

Particularly preferably, the second component part of the fastening mechanism projects from the first component part of the fastening mechanism and namely preferably in the form of at least one pin. Said pin may have at one free end region an external thread so that the at least one pin may be passed through a corresponding opening of a support of the airbag package and may be screwed by means of a nut for securing to the support.

Preferably, the second component part of the fastening mechanism is configured to extend longitudinally in a direction of extension, the sealing element preferably surrounding the second component part of the fastening mechanism in cross section (i.e. transversely to the direction of extension). Whilst the second component part of the fastening mechanism is passed through the opening of the protective covering out of the space surrounded by the protective covering, the first component part connected to the second component part of the fastening mechanism is arranged in an interior of the airbag surrounded by the airbag. Preferably, the first component part of the fastening mechanism therefore comprises a bearing region extending transversely to the direction of extension, against which the airbag partially bears. For securing the airbag package to a support of the airbag package, the portion of the airbag bearing against the bearing region of the first component part of the fastening mechanism may be clamped between said bearing region and a corresponding flat region of the support of the airbag package (for example a motor vehicle part). The airbag comprises at least one (aligned) through-opening corresponding with the opening of the protective covering and the second component part, which is defined by a first edge region of the airbag surrounding the through-opening. The aligned openings allow the second component part of the fastening mechanism to pass out of the interior of the airbag.

The second component part of the fastening mechanism is thus passed in the direction of extension through the corresponding through-opening of the airbag, so that the first edge region of the airbag which surrounds said through-opening, is arranged in the direction of extension between the bearing region of the first component part of the fastening mechanism and a second edge region (edge) of the protective covering bordering the opening of the protective covering.

In one embodiment, it is provided that the sealing element for sealing (closing in a gastight manner) the opening of the protective covering presses the second edge region of the protective covering in the direction of extension of the second component part against the bearing region of the first component part of the fastening mechanism.

In a further embodiment of the invention, the sealing element seals the opening of the protective sleeve, to press the second edge region of the protective covering together with the first edge region of the airbag in the direction of extension against the bearing region of the first component part of the fastening mechanism. The sealing element comprises a body surrounding the second component part of the fastening mechanism in cross section, and in particular formed in a hollow cylindrical shape, which is aligned with the second component part of the fastening mechanism. Preferably, said body comprises a casing bearing against the second component part and engaging around the second component part in cross section, from which a flange surrounding the casing projects transversely to the direction of extension, and which comprises a flat annular first face facing the second edge region of the protective covering in the direction of extension, by means of which it bears, for closing in a gastight manner the opening of the protective covering, sealingly against the second edge region of the protective covering.

Preferably, the sealing element comprises a flexible bearing element arranged in the direction of extension between the flange and the second edge region of the protective covering surrounding the opening, which sealingly bears against the second edge region of the protective covering. A force in the direction of the second edge region of the protective covering is provided therefore by the (hollow cylindrical) body of the sealing element that is secured in a suitable manner (e.g., clamped) to the second component part of the fastening mechanism. The force presses the bearing element in a sealing manner on the second edge region and thus compresses said bearing element in the direction of extension. Preferably, the bearing element is formed as a sealing ring which engages around the second component part of the fastening mechanism in cross section.

In one embodiment of the invention, the sealing element is configured to engage around the second edge region of the protective covering as well as the second component part of the fastening mechanism in cross section and thus for sealing the opening of the protective covering to press the second edge region of the protective covering transversely to the direction of extension against the second component part of the fastening mechanism. The sealing element is preferably configured as a tube that is pulled in the direction of extension over the second edge region of the protective covering and is pretensioned against the second edge region. For producing the pretensioning, the tube may be configured from an elastic (resilient) material or it may be a heat-shrinkable tube which, when heated, contracts and as a result is pretensioned against the second component part by the interposition of the second edge region. As an alternative, the sealing element may be configured as a flexible O-ring.

In a further variant of the invention, the sealing element for sealing the opening of the protective covering in a gastight manner is pretensioned in the direction of extension against the second edge region of the protective covering surrounding the opening, so that the second edge region of the protective covering, possibly by the interposition of a region of the airbag, is pressed in the direction of extension against the bearing region of the first component part of the fastening mechanism.

Preferably, the sealing element is therefore pretensioned transversely to the direction of extension against the second component part of the fastening mechanism. As a result, the sealing element may be secured to the second component part of the fastening mechanism so that a pretensioning of the sealing element may be continually maintained against the second edge region of the protective covering in the direction of extension. Preferably, the sealing mechanism comprises a spring element to generate the pretensioning against the second edge region of the protective covering and/or against the second component part of the fastening mechanism In a further embodiment, the sealing element is formed by the second edge region of the protective covering surrounding the opening and is pressed against the second component part of the fastening mechanism when generating a vacuum in the space of the protective covering, so that the opening of the protective covering is sealed in a gastight manner. The second edge region may thus be deformed so that it is partially extended in the direction of extension, even before generating a vacuum in the space surrounded by the protective covering. The second edge region engages around the second component part tightly, so that when applying the vacuum no air is sucked in along the second component part through the opening of the protective covering into the space surrounded by the protective covering.

In a further variant of the invention, the sealing element is configured as a coating of the second component part surrounding the second component part of the fastening mechanism in cross section, to which the second edge region surrounding the opening of the protective covering is connected so that the opening of the protective covering is sealed in a gastight manner. The second edge region may, for example, be bonded or welded to the coating.

Preferably, the coating is coupled to the second edge region of the protective covering by heating. As an alternative, the coating may also be configured to be able to be activated mechanically, so that the coating, in particular by pressing the second edge region of the protective covering against the coating, is connected in a gastight manner to the second edge region of the protective covering.

A variant of the invention provides that the sealing mechanism comprises an additional, deformable (highly viscous) sealing mass, which is preferably arranged between the sealing element and the second edge region of the protective covering. The deformable sealing mass serves to fill free spaces and/or hollow spaces which are possibly still present between the sealing element and the second edge region of the protective covering. Alternatively or additionally, the sealing mass is at least partially arranged between the second edge region of the protective covering surrounding the opening of the protective covering and the first edge region of the airbag bordering the through-opening of the airbag.

Preferably, the additional, deformable sealing mass bears against the second component part of the fastening mechanism and namely so that the sealing mass surrounds the second component part of the fastening mechanism in cross section. As a result, gases are prevented from being able to penetrate in the direction of extension between the second component part of the fastening mechanism and the sealing element into the space surrounded by the protective covering.

For compensating for unevenness of the airbag on the first edge region of the airbag, for example in the form of folds or seams of the airbag, a disk element is provided which preferably surrounds the second component part of the fastening mechanism in cross section in an annular manner and which is preferably arranged in the direction of extension of the second component part of the fastening mechanism between the second edge region of the protective covering and the first edge region of the airbag. Preferably, the sealing mass is arranged at least partially in the direction of extension between the disk element and the second edge region of the protective covering. Advantageously, the sealing mass thus fills up an entire free space which is defined by the disk element, the second edge region of the protective covering and the second component part of the fastening mechanism. Additionally, it is preferably provided that the sealing mass is also arranged in the direction of extension between the disk element and the first edge region of the airbag.

In a variant of the invention, the bearing region of the first component part of the fastening mechanism is configured as a flat ring which is provided for bearing against a third edge region of the airbag bordering an inlet opening of the airbag and namely so that the third edge region of the airbag is arranged in the direction of extension between the bearing region of the first component part of the fastening mechanism and the protective covering. The bearing region serves to clamp the airbag (and also the protective film) in the direction of extension of the second component part of the fastening mechanism between a support of the airbag package and the bearing region. The second component part of the fastening mechanism is passed through a corresponding opening of the support and secured there, so that the bearing region presses the portion (third edge region) of the airbag bearing against the bearing region as well as a corresponding region of the protective film against the support of the airbag package.

In the event that the bearing region is provided for bearing against the third edge region of the airbag bordering the inlet opening of the airbag, the through-opening of the airbag through which the second component part of the fastening mechanism is passed, is configured on the third edge region.

Preferably, in the direction of extension, which is perpendicular to an extension plane of the bearing region of flat, annular configuration, a diffuser projects into the interior of the airbag, which covers the inlet opening of the airbag in a cup-shaped manner from the inside. The diffuser comprises a plurality of through-openings which serve to swirl the gases conducted through the inlet opening into the airbag. In a particularly preferred variant of the invention, the second component part of the fastening mechanism is formed by a plurality of pins projecting in the direction of extension from the bearing region, which are passed through a corresponding plurality of through-openings of the airbag and openings of the protective covering aligned with the through-openings, and partially project from the space surrounded by the protective covering. Preferably, said pins (or the at least one pin), for fastening the airbag package to a support of the airbag package, comprises an external thread onto which a nut may be screwed. As an alternative, said pins may naturally also be configured so they may enter into a latching connection with a corresponding recess on a support of the airbag package. Moreover, the pins may also be configured as rivets.

In FIG. 1, an airbag module for motor vehicles is shown which comprises an airbag 1 folded to form an airbag package 10 which may be inflated in the event of a crash by means of a gas generator 3, to form an air cushion to protect a vehicle passenger.

The gas generator 3 is a so-called tubular gas generator with a tubular generator body 30 and an ignition device 32 projecting from the casing of the generator body 30, which consists of a dimensionally stable ignition element (igniter 33) surrounded by a metallic housing and an electric ignition cable 34 projecting therefrom which may be connected to the igniter 33 directly or via a plug connector.

The gas generator 3 is arranged inside the folded airbag 1, the regions of the airbag 1 folded to form an airbag package 10 being located in front of a part of the peripheral surface of the generator body 30 and the two front faces as well as the remaining regions of the peripheral surface of the gas generator being enclosed by an unfolded layer 11 of the airbag 1. In the unfolded layer 11 thereof, the airbag 1 comprises an opening 12 through which the igniter 33 of the ignition device 32 projects from the interior I enclosed by the airbag 1 and is connected there by an ignition cable 34.

The airbag 1 and the gas generator 3 are enclosed in a gastight manner by a flexible protective covering 2—formed by a rupturable film when inflating and unfolding the airbag 1. This means that, by using a vacuum, see DE 101 14 208 A1 and DE 10 2004 056 128, the airbag is folded to form a particularly compact airbag package and subsequently may remain maintained in this compact form inside the gastight protective covering. The protective covering 2 comprises, in the region of the igniter 33 projecting in the radial direction r from the peripheral surface of the generator body 30, an opening 22 through which the igniter 33 projects from the space enclosed by the protective covering 2, said opening 22 being sealed in a gastight manner by means of a sealing element 4 in the form of an elastic sealing ring. The sealing ring 4 is positioned on the igniter 33 of the ignition device 32 so that it presses the edge of the opening 22 of the flexible protective covering 2, which also may be configured as an edge region, inwardly against the igniter 33. The sealing element 4 in the form of a sealing ring is received together with the associated edge region of the flexible protective covering 2, which also is denoted as second edge region, in an annular peripheral recess 35 of the igniter 33. The edge of the opening 22 of the flexible protective covering 2 thus bears fixedly by pretensioning against an igniter 33 forming a support region, so that through the opening 22 no air is able to penetrate into the space R subjected to a vacuum and enclosed by the flexible protective covering 2.

For assembling the arrangement shown in FIG. 1, firstly the airbag 1 and the gas generator 3 are inserted into the flexible protective covering and enclosed thereby and the entire package is reduced to a minimal package size by generating a vacuum. Subsequently, the sealing element 4 is placed on the igniter 33 and/or in the peripheral recess 35 thereof and thus the protective covering 2 is penetrated in the region of the igniter 33 to form an opening 22, so that the igniter 33 may be electrically connected to the associated ignition cable 34, for example by plugging on the ignition cable.

FIG. 2 shows in a cross section a modification of the airbag module of FIG. 1 in which the airbag 1 folded to form an airbag package 10, the gas generator 3 and the flexible protective covering 2 surrounding the airbag 1 and the gas generator 3 are arranged in a module housing 5. A lower portion 51 of the module housing 5, therefore, surrounds that region of the airbag module in which a layer 11 of the airbag 1 extends along the generator body 30 and in which an igniter 33 of an ignition device 32 penetrates openings 12, 22 aligned with one another in the airbag 1, on the one hand, and in the flexible protective covering 2, on the other hand. The module housing 5 also comprises in this portion an opening 52 which is penetrated by the igniter 33 of the gas generator 3. At the edge of this opening 52 of the module housing 5 the annular sealing element 4 is arranged which sealingly closes the opening 22 in the flexible protective covering. The sealing ring 4 is arranged and elastically pretensioned so that it distorts the edge of the opening 22 in the flexible protective covering 2 against the generator body 30 of the gas generator 3. The edge (edge region) of the opening 22 of the flexible protective covering bears, therefore, by pretensioning fixedly against the generator body 30 forming a support region so that through this opening no air is able to penetrate into the space R subjected to a vacuum and surrounded by the flexible protective covering 2.

As shown in FIG. 2, a nut 6 may be screwed onto an external thread of the igniter 32 to secure the gas generator 3 to the module housing. The sealing ring 4 is thus arranged in the region of the nut 6 on the module housing 5, so that by tightening the nut 6 the sealing ring and thus also the edge of the opening 22 of the flexible protective covering 2 are sealingly pressed against the generator body 30.

FIG. 3 shows a modification of the airbag module of FIGS. 1 and 2 with a two-stage gas generator 3 in the form of a tubular gas generator which on each of its two front faces an ignition device 32A and/or 32B projecting in the axial direction a is provided with an igniter 33A, 33B and an ignition cable 34A, 34B. Both the airbag 1 enclosing the gas generator 3 and the flexible protective covering 2 surrounding the airbag 1 and the gas generator 3 in a gastight manner, in the region of the ignition devices 32A, 32B, comprise one respective opening 12A, 22A and/or 12B, 22B, through which respectively one of the igniters 33A, 33B projects from the space R enclosed by the flexible protective covering 2 and is in contact there with one respective ignition cable 34A and/or 34B.

The two openings 22A, 22B of the flexible protective covering in the region of the igniter 33A and/or 33B are sealed by one respective sealing ring 4A and/or 4B. The respective sealing ring 4A, 4B engages around the respectively associated igniter 33A and/or 33B by the interposition of the edge of the associated opening 22A and/or the flexible protective covering 2 and is therefore respectively radially inwardly pretensioned (relative to the annular structure of the sealing element 4A and/or 4B, so that it presses the edge of the respective opening 22A, 22B of the flexible protective covering 2 against the respectively associated igniter 33A and/or 33B and as a result seals the corresponding opening 22A and/or 22B of the flexible protective covering 2.

In FIG. 4, a modification of the airbag module of FIG. 2 is shown, in which the protective covering 7 surrounding the airbag 1 and the gas generator 3 consists of a housing-like, substantially dimensionally stable (but elastic) covering 70 and a flexible covering 75. The film-like, flexible covering 75 serves therefore for covering a top surface of the housing-like covering 70, which encloses the airbag 1 and the gas generator 3 and in one portion 71 forms the opening 72, through which the ignition device 32 projects from the space R enclosed by the protective covering 7.

The sealing element 4 in the form of a sealing ring acts on a portion 71 of the housing-like covering 70 on the edge of the opening 72 so that said edge of the opening 72 is pressed against the generator body 30 and, as a result, the opening 72 is closed in a gastight manner. A certain elasticity of the covering 70 consisting preferably of plastics material is preferred to provide a gastight seal.

In the airbag module shown in FIG. 4, the evacuation of the space R enclosed by the protective covering 7 takes place preferably after introducing the airbag 1 and the gas generator 3 into the housing-like covering 70 and the subsequent gastight closing of the housing-like covering 70 on one side (relative to the opening 72) by means of the sealing element 4 and on the other side (top surface) by means of the flexible covering 75. The evacuation may, for example, take place through an opening (not shown in FIG. 4) in the housing-like covering 70, which subsequently is closed in a gastight manner. Alternatively, an evacuation in the connecting region between the flexible covering 75 and the housing-like covering 70 is possible, and namely directly before the complete connection of said two components 70, 75 of the protective covering 7.

FIG. 5 shows a schematic sectional view of an airbag package 10 of the type shown in FIG. 1, in contrast to FIG. 1 a gas generator used to inflate the airbag 1 (gas generator 3 of FIG. 1) not being arranged inside the interior I surrounded by the airbag 1, but outside a protective covering 2 surrounding the airbag package 10, which tightly surrounds the airbag package 10 according to FIG. 1. The protective covering consists at least partially, preferably entirely, of a flexible material, for example a plastics material. The plastics material may also be a thermoplastic material. Preferably, the protective covering is configured as a protective film.

For fastening the airbag package 10, a fastening mechanism 80 is provided comprising a first component part 82 arranged in the interior I of the airbag 1 and a second component part 81 passed out of the space R surrounded by the protective covering 2 (and the interior I), via which the airbag package 10 is fastened to a support (module support). The support of the airbag package 10 may naturally also be configured as a motor vehicle part, for example in the form of a hub body of a steering wheel or an instrument panel.

The airbag 1 may be inflated with gas through an inlet opening O. Said gas may be provided by a gas generator 3 of the type shown in FIGS. 1 to 4. The inlet opening O is bordered by an edge region denoted as the third edge region O' against which a bearing region 83 of the first component part 82 of the fastening mechanism 80 lies flat, from the interior I of the airbag 1. The bearing region 83 is, therefore, configured as a retaining ring which surrounds the inlet opening O of the airbag 1. A cup-shaped diffuser 84 projects from this bearing region 83 into the interior I of the airbag 1, which comprises a plurality of through-openings (not shown in FIG. 5), through which gases conducted into the inlet opening O are able to flow into the interior I of the airbag 1, said gases being swirled.

The second component part of the fastening mechanism 80 is formed by a plurality of pins 81 extending longitudinally in a direction of extension E and which project from the bearing region 83 in the direction of extension E, the direction of extension E being located perpendicular to an extension plane, in which the bearing region 83 surrounds the inlet opening O of the airbag 1. The pins 81 may be configured integrally with the bearing region 83. As an alternative, the pins 81 may comprise on one respective free end a head 81a widened in cross section and may be passed in the direction of extension E through one respective through-opening of the bearing region 83, so that the widened head 81a with a side facing the bearing region 83 is positioned on an edge region of the through-opening bordering the respective through-opening of the bearing region 83. Additionally, such a head 81a may be permanently connected, for example welded, to the bearing region 83.

Through-openings D and corresponding openings 85 of the protective covering 2 are provided on the third edge region O' of the airbag 1. Openings D are configured to guide pins 81 from the interior I surrounded by the airbag 1, as well as from the space R surrounded by the protective covering 2, in which the airbag package 10 is arranged. Through said respectively paired congruent openings D, 85, the pins 81 project from the space R surrounded by the protective covering 2 in the direction of extension E.

For the gastight sealing (closing) of the openings 85 of the protective covering 2, so that the vacuum prevailing in the protective covering 2 is maintained, sealing mechanism 86 are provided which are arranged in the direction of extension E between respectively a first edge region 1a of the airbag 1 bordering a through-opening D and a corresponding second edge region 2a of the protective covering bordering the respective opening 85 of the protective covering 2. A sealing element 86 surrounds the respective pin 81 transversely to the direction of extension E in an annular manner, i.e. the respective sealing element 86 surrounds the respective pin 81 in cross section. The sealing elements 86, however, do not necessarily have to be arranged between the protective covering 2 and the airbag 1.

In the airbag module shown in FIG. 5, the gas generator (not shown in FIG. 5) is arranged outside the airbag package 10 and namely outside the space R surrounded by the protective covering. It is naturally also possible to arrange a gas generator required for inflating the airbag 1 in the interior I of the airbag 1 and/or in the space R of the protective covering 2.

As in the airbag module shown in FIG. 5, the gas generator may be arranged outside the space R of the protective covering 2, when inflating the airbag 1 the component part of the protective covering 2 which, from one side of the protective covering remote from the space R, covers the diffuser 84, is damaged when inflating the airbag 1 by the hot gases or an alternative mechanism. Due to the shape of the diffuser 84, projecting into the interior I, possible burnt residues of the aforementioned region of the protective covering 2 are thrown into the interior of the airbag 1.

FIG. 6A shows a detailed sectional view of a part of the airbag module shown in FIG. 5, and namely a portion of the bearing region 83 of the fastening mechanism 80 with a pin 81 projecting in the direction of extension E. Said pin penetrates in the direction of extension E a through-opening D of the airbag 1 as well as an opening 85 of the protective covering 2 located thereover in the direction of extension E. The bearing region 83 comprises a bearing face 83a against which a portion of the airbag 1 bears which, after securing the fastening mechanism 80 to a support of the airbag module is clamped in the direction of extension E between the bearing face 83a and a flat region of the support, as well as a face 83b remote from the bearing face 83a, from which the diffuser 84 projects into the interior I of the airbag 1.

The airbag 1 is enclosed by the protective covering 2 so that the airbag in the region of the pin 81 in the direction of extension E is arranged between the bearing face 83a of the bearing region 83 and the protective covering 2.

For sealing the opening 85 of the protective covering 2 so that through the opening 85 no air (gas) is able to reach the space R surrounded by the protective covering 2, a sealing element 86 is provided that, in contrast to FIG. 5, is configured as a self-locking spring element 88a, which preferably is produced from a metal or a plastics material. The spring element 88a has the shape of a conical casing which completely surrounds the pin 81 transversely to the direction of extension E and comprises a cross section widening towards the bearing region 83 counter to the direction of extension E (relative to a cross sectional plane oriented perpendicular to the direction of extension E) so that an outer face 88a' of the spring element 88a, in the shape of a conical casing, remote from the pin 81 has a concave curvature and/or the inner face 88a" of the spring element 88a remote from the outer face 88a' has a corresponding convex curvature.

The spring element 88a comprises a first end remote from the bearing region 83 of the fastening mechanism in the direction of extension E as well as a second end facing the bearing region 83. At the first end of the spring element 88a an edge A is thus formed which surrounds the pin 81 transversely to the direction of extension E and bears under pretensioning in a linear manner against the pin 81, i.e. the spring element 88a exerts a force on the pin 81, transversely to the direction of extension E. At the second end of the spring element 88a, a second edge A' is formed which surrounds the pin 81 transversely to the direction of extension E at a distance, and by pretensioning bears against an edge region 2a of the protective covering 2 surrounding the opening 85 of the protective covering 2, so that said second edge region 2a by the interposition of the airbag 1 is pressed against the bearing face 83a of the bearing region 83 of the fastening mechanism counter to the direction of extension E. As a result, the opening of the protective covering 2 is sealed so that no air is able to enter the space R of the protective covering 2. To generate the pretensioning, by means of which the spring element 88a presses, counter to the direction of extension E, the protective covering 2 against the bearing region 83, the spring element 88a only has to be pushed counter to the direction of extension E onto the pin 81, and counter to the direction of extension E against the protective covering 2 (and thus against the bearing region 83). As the spring element 88a simultaneously is pretensioned transversely to the direction of extension E against the pin 81, the spring element 88a may be fixed in the direction of extension E so that the pretensioning of the spring element 88a is maintained against the protective covering 2 and/or the bearing region 83.

The amount of pretensioning against the bearing region 83 is thus determined from the restoring characteristic of the spring element 88*a* as well as the force by means of which the spring element 88*a* is pressed counter to the direction of extension E against the bearing region 83 of the fastening mechanism. Depending on this force, the concave and/or convex curvature of the casing of the spring element 88*a* is namely increased and the corresponding restoring forces are introduced via the first edge A and/or the second edge A' into the pin 81 and/or the bearing region 83 (by the interposition of the protective covering 2 as well as the airbag 1).

For improving the sealing effect, the protective covering 2 is configured in the region of the opening 85 of the protective covering 2 so that the second edge region 2*a* of the protective covering 2 which defines the opening 85 of the protective covering 2, partially bears against the pin 81 tightly and engages around said pin in an annular manner.

Figure 6B:
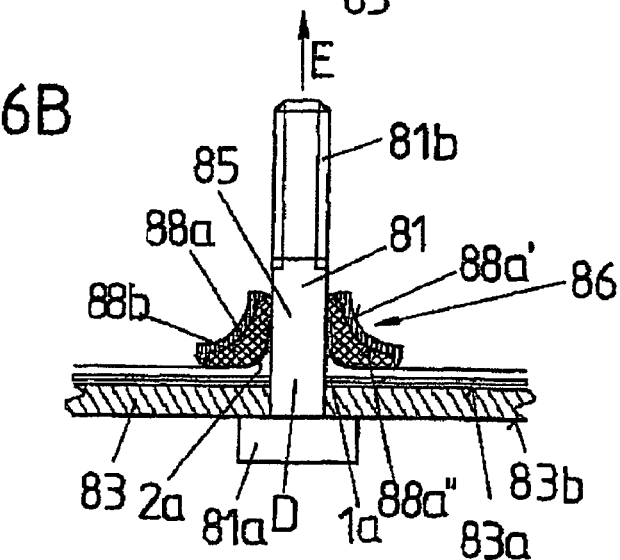

FIG. 6B shows a modification of the sealing element 86 shown in FIG. 6A, in contrast to FIG. 6A additionally to the spring element 88*a* the sealing element 86 comprising a sealing mass 88*b* which is arranged in a free space which is defined by the interior 88*a*" of the spring element 88*a* as well as by the protective covering 2 and the pin 81. The sealing mass 88*b* therefore engages around the pin 81 transversely to the direction of extension E and is configured to be deformable (highly viscous), in particular, so that it does not counter the resilience (elasticity) of the spring element 88*a*. The sealing mass 88*b* fills up the free space completely and thus bears partially against a portion of the pin 81 projecting from the protective covering 2 through the opening 85. As a result, the opening 85 of the protective covering 2 is additionally sealed. As the sealing mass 88*b* completely fills the aforementioned free space, it also serves to transmit the spring force of the spring element 88*a* to the second edge region 2*a* of the protective covering 2 that is pressed evenly both against the pin 81 and against the bearing face 83*a* of the bearing region 83 (by the interposition of the airbag 1).

Figure 6C:
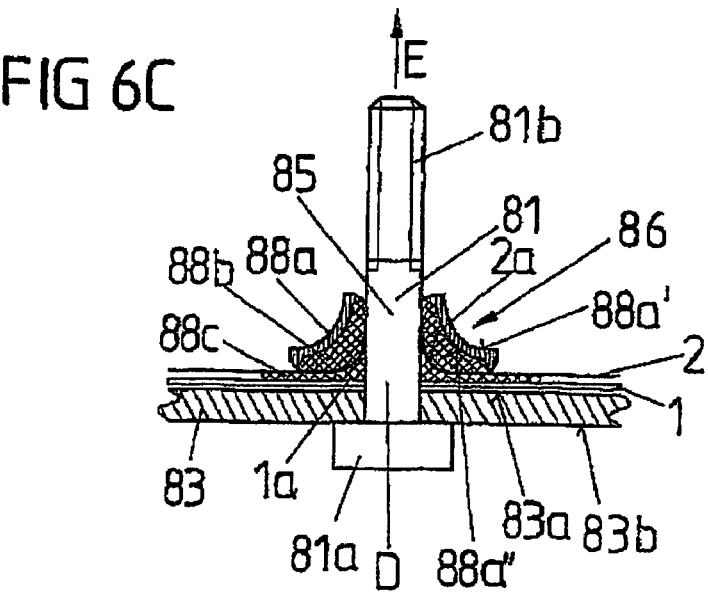

FIG. 6*c* shows a further modification of the sealing element 86 shown in FIG. 6A and/or FIG. 6B, in contrast to FIG. 6B additionally to the sealing mass 88*b* a further sealing mass 88*c* in the direction of extension E being arranged between the second edge region 2*a* of the protective covering 2 and the first edge region 1*a* of the airbag 1. As a result, the seal of the sealing element 86 is further improved as, consequently, in the direction of extension E a longer portion of the pin 81 is covered by the sealing mass.

A larger region of the second edge region 2*a* of the protective covering 2 as well as a larger region of the first edge region 1*a* of the airbag 1 is then covered by the sealing mass 88*b*, 88*c*, so that the entry of air through the opening 85 into the space R of the protective covering 2 is effectively made more difficult.

Figure 7A:
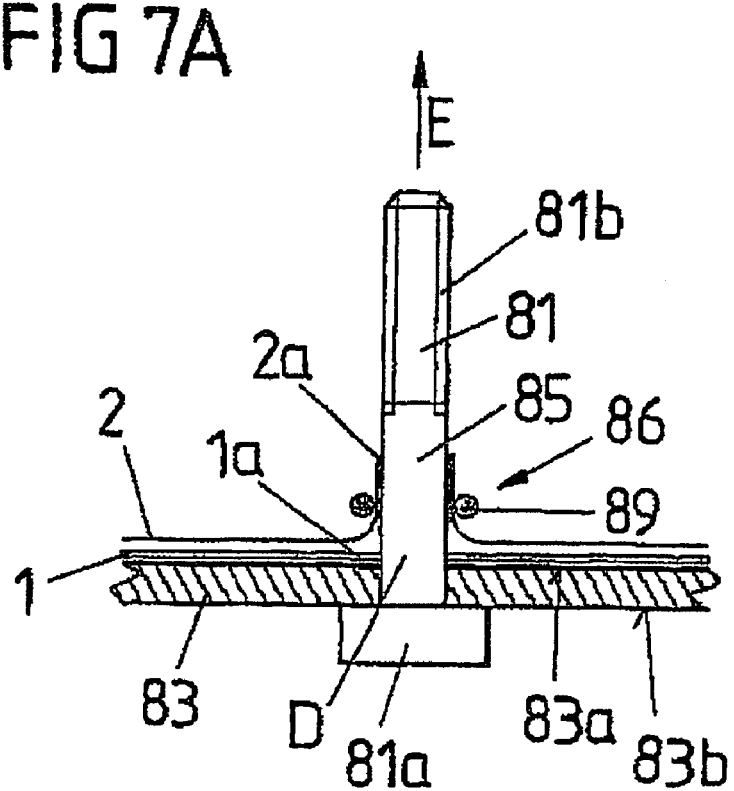
FIGS. 7A-7B are cross-sections of a fastening mechanism for the airbag module of FIG. 5 according to several exemplary embodiments, the opening of the protective covering penetrated by the second component part of the fastening mechanism being sealed by means of an annular sealing element.

FIG. 7A shows a modification of the sealing element 86 shown in FIG. 6A, in contrast to FIG. 6A the sealing element 86 not being formed by a spring element 88*a* but by an O-ring 89 made of a flexible material which, for closing the opening 85 in a gastight manner counter to the direction of extension E, is slipped over the pin 81 and the second edge region 2*a* bearing against the pin 81, so that it is able to press the second edge region 2*a* of the protective covering 2 transversely to the direction of extension E against the pin 81. The O-ring 89 is pretensioned against the second edge region 2*a* of the protective covering 2 bearing against the pin 81. The amount of pretensioning is thus determined by the material of the O-ring as well as by the degree of expansion of the O-ring which is adjusted when pulling the O-ring onto the pin 81.

Figure 7B:
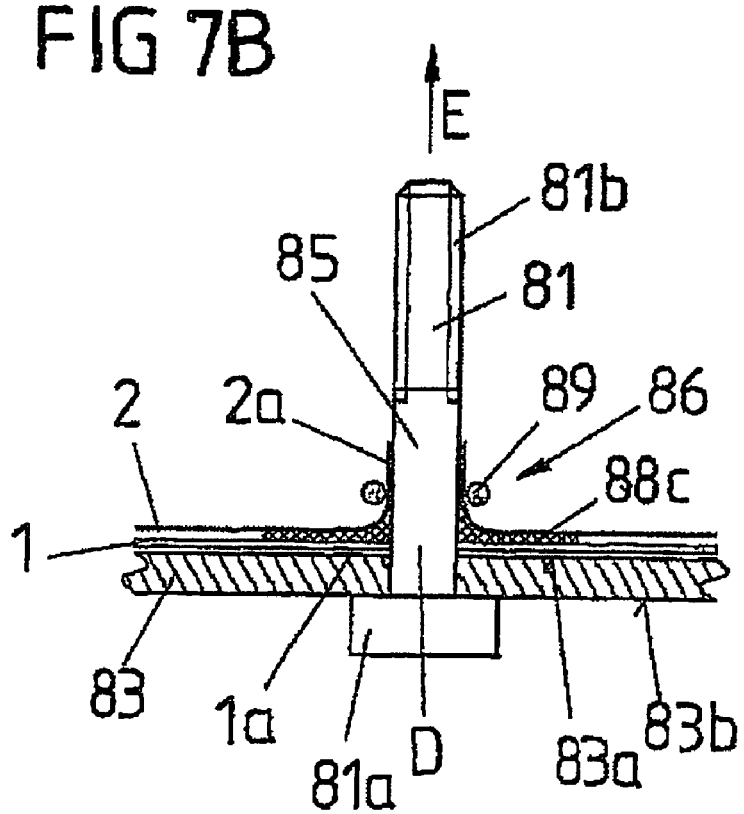

FIG. 7B shows the O-ring of the sealing element 86 shown in FIG. 7A, a sealing mass 88*c* being provided additionally to the O-ring 89 which, according to FIG. 6C, in the direction of extension E is arranged between the second edge region 2*a* of the protective covering 2 and the first edge region 1*a* of the airbag 1 bordering the through-opening D of the airbag. The highly viscous sealing mass 88*c* completely fills a region surrounding the pin 81 transversely to the direction of extension E which extends in the direction of extension E between the second edge region 2*a* and the first edge region 1*a*, the sealing mass 88*c* bearing sealingly against the second and the first edge region 2*a*, 1*a* as well as a portion of the pin 81 which extends in the direction of extension E from the edge region 1*a*, approximately as far as the O-ring 89.

Figure 8A:
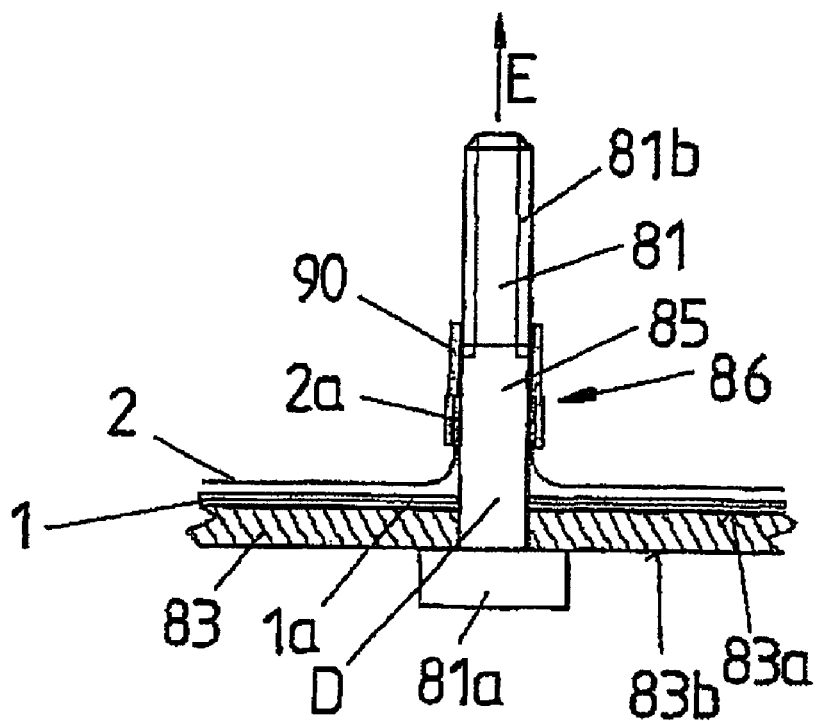
FIGS. 8A-8B are cross-sections of a fastening mechanism for the airbag module of FIG. 5 according to several exemplary embodiments, the opening of the protective covering from which the second component part of the fastening mechanism projects from the space surrounded by the protective covering being sealed by means of a tubular sealing element.
Figure 8B:
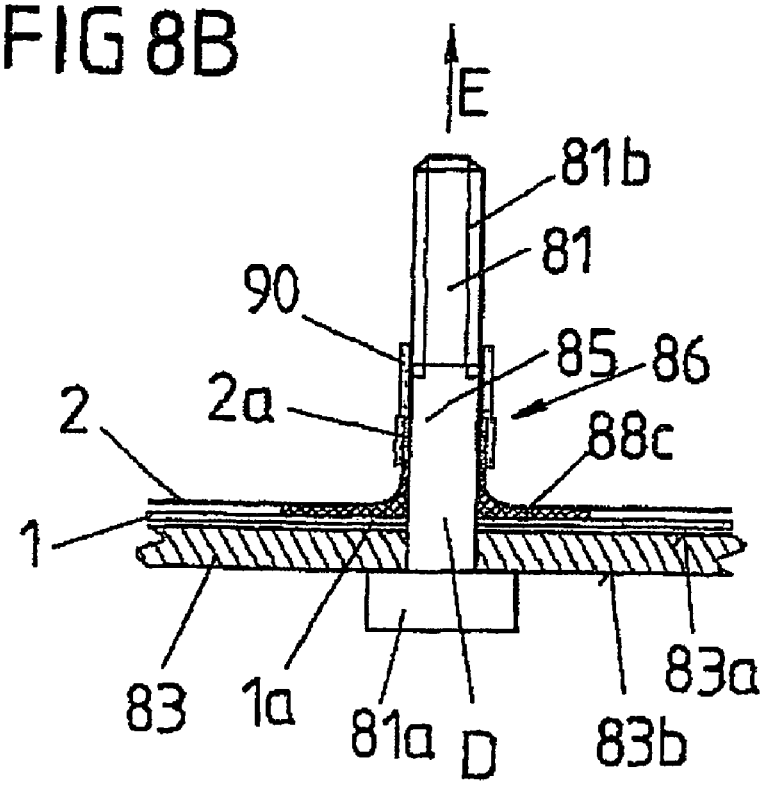

FIG. 8A shows a modification of the sealing arrangement shown in FIG. 7A, in contrast to FIG. 7A the sealing element 86 not being formed by an O-ring 89 but by a flexible tube 90 which, in the direction of extension E, is pulled over the second edge region 2*a* of the protective covering 2 bearing against the pin 81, the tube 90 being provided so that it is pretensioned transversely to the direction of extension E against the pin 81, so that, tightly bearing against the second edge region 2*a*, it may press said second edge region transversely to the direction of extension E against the pin 81. As a result, the opening 85 of the protective covering 2 bordered by the second edge region 2*a* is sealed in a gastight manner. The tube may be a resilient tube or for example a heat-shrinkable tube, which contracts when heated about the pin 81 and thus provides the pretensioning against the pin 81. Additionally, the tube 90 has in the direction of extension E a portion which projects over the second edge region 2*a* and bears tightly against the pin 81. As a result, the seal is increased relative to a tube 90 merely bearing against the edge region 2*a*.

According to FIG. 7B, naturally with a sealing element 86 configured as a tube 90, a deformable sealing mass 88*c* according to FIG. 7B (and/or FIG. 6C) may also be used which is arranged according to FIGS. 6C and 7B on the pin 81 and the seal of the sealing element 86 is additionally increased.

Figure 9A:
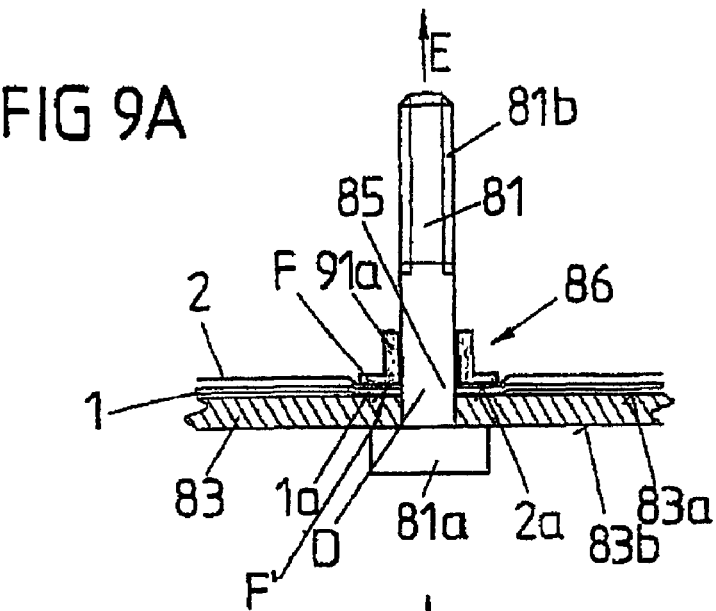
FIGS. 9A-9C are cross-sections of a fastening mechanism for the airbag module of FIG. 5 according to several exemplary embodiments, the opening of the protective covering being sealed by means of a sealing element in the form of an interference fit.

FIG. 9A shows a detailed sectional view of a modification of the sealing element shown in FIG. 6A, which in contrast to FIG. 6A is formed by a hollow cylindrical body which bears tightly against the pin 81 and engages around said pin transversely to the direction of extension E, i.e. in cross section. The hollow cylindrical shaped body 91*a* is formed preferably of a metal or a plastics material and comprises at one end facing the bearing region 83 a region F projecting transversely to the direction of extension E from the hollow cylindrical body 91*a*, in the form of a flange, which surrounds the pin 81 on one face of the hollow cylindrical body 91*a* remote from the pin 81 in an annular manner. The flange F comprises a first face F' facing the second edge region 2*a* of the protective covering 2 that lies flat against the second edge region 2*a* of the protective covering 2.

For sealing the opening 85 of the protective covering 2, the hollow cylindrical body 91*a* is positioned on the pin 81 in the direction of extension E, so that it tightly grips around the pin 81 in cross section. In this connection, the internal diameter of the hollow cylindrical body 91*a* is dimensioned so that the body 91*a*, when positioned on the pin 81, is pretensioned against said pin transversely to the direction of extension E. As a result, the hollow cylindrical body 91*a* may be secured on the pin 81, so that a pretensioning of the hollow cylindrical body 91*a* counter to the direction of extension E may be maintained against the bearing region 83 (by the interposition of the protective covering 2 of the airbag 1). The hollow cylindrical body 91*a* thus forms an interference fit which, with its first face F' facing the bearing region 83 of the flange F, presses the second edge region 2*a* of the protective covering 2 which defines the opening 85*a* of the protective covering 2, by the interposition of the first edge region 1*a* of the airbag 1 against the bearing face 83*a* of the bearing region 83 of the fastening element 80. As, therefore, the second edge region 2*a* of the protective covering 2 bordering the opening 85 as well as the first edge region 1*a* of the airbag 1 bordering the through-opening D are fixedly clamped between the first face F' of the flange F and the bearing face 83*a* of the bearing region 83, a seal of the opening 85 of the protective covering 2 is achieved so that no air may penetrate through the opening 85 into the space R surrounded by the protective covering 2. Thus the advantageous compactness of the airbag package 10 produced by the vacuum in the space R is continuously maintained.

Figure 9B:
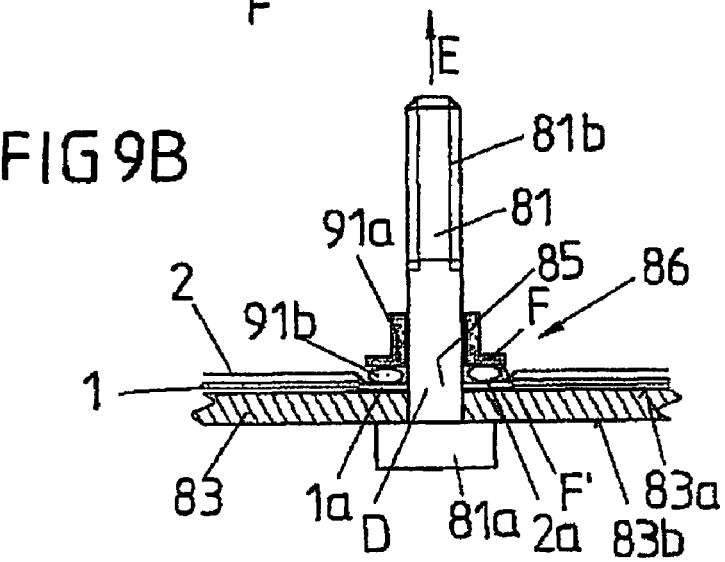

In a development according to FIG. 9B, between the first face F' of the flange F of the hollow cylindrical body 91*a* and the second edge region 2*a* of the protective covering 2 (in the direction of extension E), a bearing element 91*b* is provided in the form of a (flexible) sealing ring which surrounds the pin 81 in cross section and is pressed by the hollow cylindrical body 91*a* counter to the direction of extension E against the second edge region 2*a* of the protective covering 2. The bearing element 91*b* is compressed in the direction of extension E so that it sealingly nestles against the second edge region 2*a* as well as against the face of the flange F. By means of the bearing element 91*b* unevenness of the second edge region 2*a* (folds or seams) and/or of the first edge region 1*a* of the airbag 1 located thereunder in the direction of extension E as well as possible unevenness of the bearing face 83*a* of the bearing region 83 are compensated.

Figure 9C:
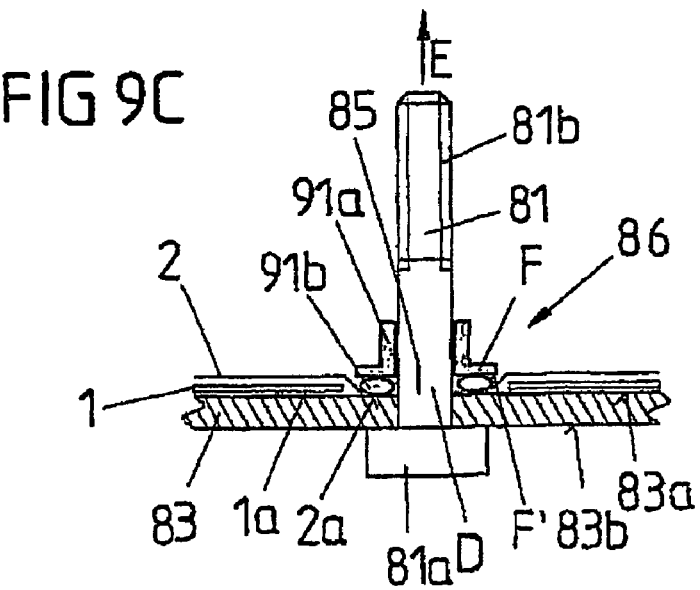

As an alternative to the sealing arrangements shown in FIGS. 9A and 9B, according to the seal shown in FIG. 9C of the opening 85, the through-opening D of the airbag 1 is configured to be of large surface area so that the bearing element 91*b* presses the second edge region 2*a* of the protective covering 2 without the interposition of the first edge region 1*a* of the airbag 1 against the bearing face 83*a* of the bearing region 83. This is advantageous in that in the direction of extension E merely the region between the bearing face 83*a* and the second edge region 2*a* of the protective covering 2 has to be sealed, i.e. it is merely required to press the second edge region 2*a* of the protective covering 2 sealingly against the bearing region 83*a*.

FIG. 10A shows a detailed sectional view of a further embodiment of the sealing element 86 in which in contrast to FIGS. 6A to 9C the sealing element 86 is configured integrally with the protective covering 2, i.e. is formed by the second edge region 2*a*, which is configured so that it bears sealingly against the pin 81 when applying a vacuum in the space R surrounded by the protective covering 2 and tightly encloses said pin in cross section.

According to FIG. 10B, the sealing element 86 forms a sealing mass 92*a* that is configured to be deformable and is arranged between the edge region 2*a* of the protective covering 2 and the first edge region 1*a* of the airbag 1, so that it covers in the direction of extension E a portion of the pin 81 reaching from the first edge region of the airbag 1 as far as the opening 85 of the protective covering 2. Due to the deformability of the sealing mass 92*a*, said sealing mass, when applying a vacuum in the space R of the protective covering 2, is conically distributed about the pin 81 and pressed against the pin 81 and the first edge region 1*a*, a top surface remote from the pin 81 and the first edge region 1*a* of the conically distributed sealing mass 92*a* having a concave curvature.

FIG. 10C shows a modification of the sealing arrangement shown in FIG. 10B. In contrast to FIG. 10B, the sealing element 86 comprises a disk element 92*b* that extends in an annular manner in an extension plane oriented perpendicularly to the direction of extension E and surrounds the pin 81 transversely to the direction of extension E. The disk element 92*b* is arranged in the direction of extension E between the sealing mass 92*a* and the first edge region 1*a* of the airbag 1. The disk element 92*b* bears tightly against the edge region 1*a* of the airbag 1 and serves to compensate for unevenness of the airbag (for example seams or folds).

According to the sealing arrangement shown in FIG. 10D, a further highly viscous sealing mass 92*c* is arranged that fills up a free space in the direction of extension E between the first edge region 1*a* of the airbag 1 and a face facing the first edge region 1*a* in the direction of extension E of the disk shaped element 92*b*. Transversely to the direction of extension E, the sealing mass 92*c* thus projects over an outermost edge of the disk element 92*b* and connects the protective covering 2 to the airbag 1 which further improves the sealing effect of such a constructed sealing element 86.

Figure 11A:
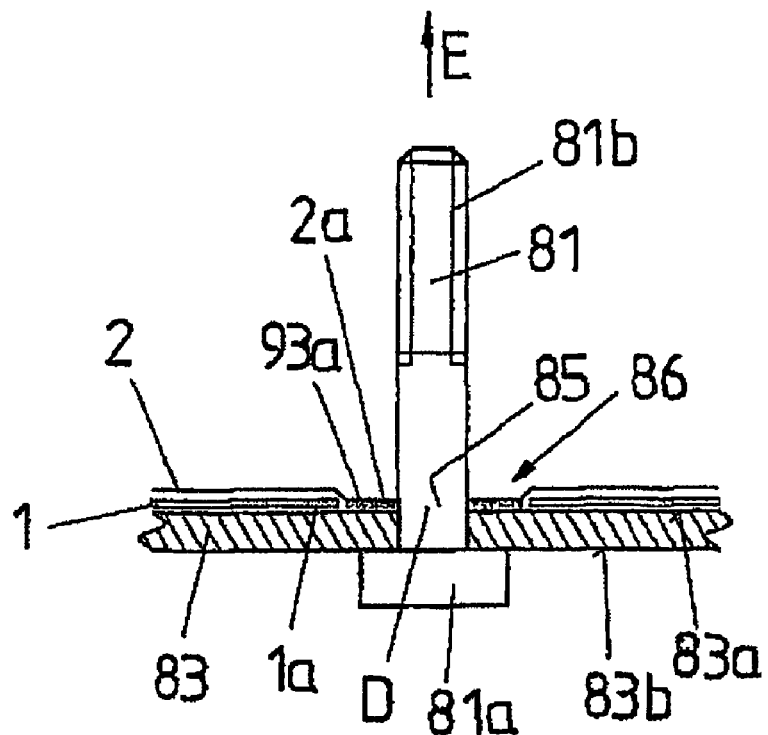
FIGS. 11A-11B are cross-sections of a fastening mechanism for the airbag module of FIG. 5 according to several exemplary embodiments, the opening of the protective covering penetrated by the second component part of the fastening mechanism being sealed by means of a sealing element, which is configured as a coating of the bearing region and/or as a separate thermoplastic element.

FIG. 11A shows a detailed sectional view of a further variant of the sealing element 86 that, in contrast to FIGS. 6A to 10D, is configured as a coating 93*a* configured on the bearing face 83*a* of the bearing region 83. The coating 93*a* thus surrounds the pin 81 transversely to the direction of extension E in an annular two-dimensional manner. The second edge region 2*a* of the protective covering 2 bordering the opening 85 of the protective covering 2, lies flat against said coating 93*a* and is connected to the bearing face 83*a* of the bearing region 83 via this coating so that the opening 85 of the protective covering 2 is sealed in a gastight manner, i.e. transversely to the direction of extension E no air is able to penetrate from the opening 85 between the second edge region 2*a* of the protective covering 2 and the bearing region 83 and into the space R of the protective covering 2. So that via the coating 93*a* a gastight connection between the second edge region 2*a* and the bearing face 83*a* of the bearing region 83 is possible, the diameter of the through-opening D of the airbag 1 is dimensioned so that the first edge region 1*a* of the airbag 1 does not cover the region of the bearing face 83*a* of the bearing region 83 coated with the coating 93*a*. The coating 93*a* is preferably configured so that it forms a gastight connection with the second edge region of the protective covering 2 only after being activated. The coating 93*a*, for example, may be configured to be able to be thermally activated, i.e. for producing a gastight connection between the coating 93*a* and the second edge region 2*a* of the protective covering 2, the coating 93*a* has to be heated, preferably the edge region 2*a* resting on the coating 93*a*. With subsequent cooling of the coating 93*a*, a gastight connection is formed between the second edge region 2*a* and the coating 93*a*. As an alternative, the coating 2*a* may be configured to be able to be activated mechanically, i.e. a gastight connection between the second edge region 2*a* of the protective covering 2 and the coating 93*a* is produced by the edge region 2*a* being pressed against the coating 93*a* with a contact pressure exceeding a predeterminable threshold pressure.

Alternatively to the coating 93*a*, the sealing element 86 may be formed by a separately configured thermoplastic element 93*a*, which is pushed, before covering the airbag package 10 with the protective covering 2, counter to the direction of extension E over the pin 81, so that the thermoplastic element 93*a* tightly grips around the pin 81 in cross section, i.e. transversely to the direction of extension E. The annular thermoplastic element 93*a* with one face facing the bearing face 83*a* may bear against the bearing face 83*a* either directly or alternatively by the interposition of the first edge region 1a. Thus the airbag package 10 is enclosed by the protective covering 2 so that the thermoplastic element 93a is arranged in the direction of extension E between the bearing face 83a and the second edge region 2a of the protective covering 2 and/or between the first edge region 1a of the airbag 1 and the second edge region 2a.

For closing the opening 85 in a gastight manner, the thermoplastic element 93a is subsequently thermoplastically deformed. For example, the second edge region 2a of the protective covering 2 melts in a gastight manner with the thermoplastic element 93a, which in turn engages around the pin 81 so that, counter to the direction of extension E, (between the pin 81 and through the thermoplastic element 93a) no air is able to penetrate into the space R. As an alternative, the bearing face 83a and/or the first edge region 1a of the airbag 1 may be melted with the thermoplastic element 93a and the thermoplastic element 93a may be melted with the second edge region 2a of the protective covering 2, so that the opening 85 of the protective covering 2 is closed in a gastight manner.

Additionally, the thermoplastic element 93a may naturally also be melted with the pin 81, and/or by melting may be applied against the pin 81 in a gastight manner. For the thermoplastic deformation of the thermoplastic element 93a, a heated sleeve may be used (not shown in FIG. 11A) which counter to the direction of extension E is pushed over the pin 81 and counter to the direction of extension E is pressed against the second edge region 2a as well as (in the direction of extension E) the thermoplastic element 93 located thereunder. As a result, the protective covering 2 is melted with the thermoplastic element 93a, whereby the opening 85 is closed in a gastight manner. After sealing the opening 85 and/or a plurality of such openings 85, a vacuum may be provided in the space R of the protective covering 2 which compresses the airbag package 10 into a small package size.

Figure 11B:
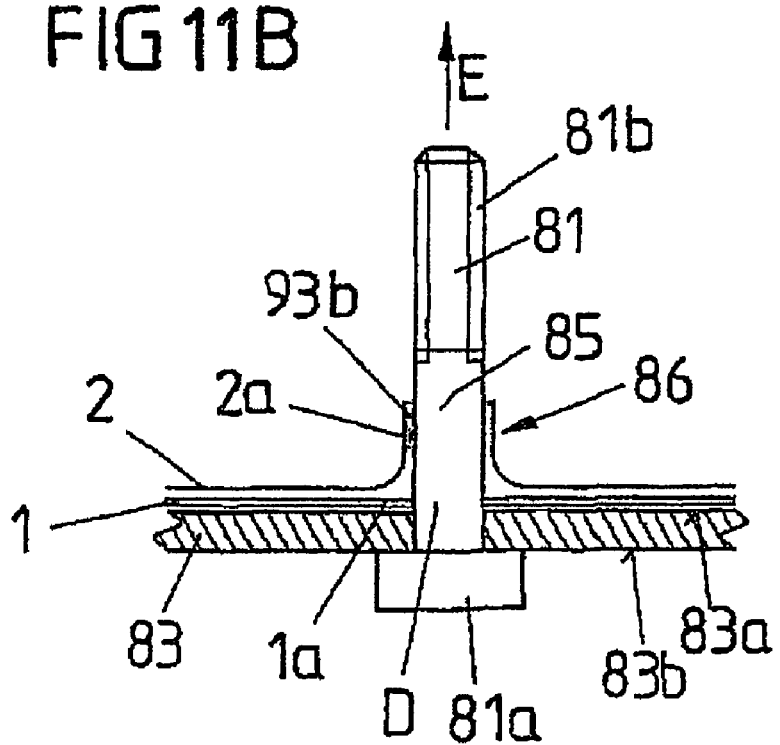

FIG. 11B shows a modification of the sealing element 86 shown in FIG. 11A (consisting of a coating 93a), in contrast to FIG. 11A the coating 93b not being configured on the bearing region 83 but in the direction of extension E spaced apart from the bearing region 83 on the pin 81. The coating 93b surrounds the pin 81 in cross section in an annular manner.

The second edge region 2a of the protective covering 2 lies flat against said coating 93b and is thus connected thereto in a gastight manner, so that in the direction of extension E between the pin 81 and the second edge region 2a no air is able to penetrate through the opening 85 of the protective covering 2 into the space R surrounded by the protective covering 2. Further, the coating 93b may be configured to be able to be activated thermally and/or mechanically.

The priority application, German Patent Application No. 20 2005 011878.8, filed Jul. 21, 2005 including the specification, drawings, claims and abstract, is incorporated herein by reference in its entirety.

What is claimed is:

1. An airbag module for a motor vehicle, comprising
an airbag folded to form an airbag package;
a component of the airbag module, which via a first component part for inflating the airbag with gas or for fastening the airbag to a motor vehicle part cooperates with the airbag;
a protective covering which encloses the airbag and the first component part in a gastight space that is maintained at a vacuum so that the airbag package formed by the airbag is compact; and
the protective covering comprises at least one opening, through which a second component part connected to the first component part projects from the space enclosed by the protective covering and;
a sealing element configured to seal the opening of the protective covering in a gastight manner in order to maintain the vacuum in the enclosed space.

2. The airbag module as claimed in claim 1, wherein the sealing element extends in an annular manner along the edge of the opening of the protective covering.

3. The airbag module as claimed in claim 2, wherein the sealing element is configured as a sealing ring.

4. The airbag module as claimed in claim 1, wherein the sealing element is configured in one piece or in a plurality of pieces.

5. The airbag module as claimed in claim 1, wherein the sealing element consists at least partially of an elastically deformable material.

6. The airbag module as claimed in claim 1, wherein the sealing element is configured at least partially of a thermoplastic material.

7. The airbag module as claimed in claim 1, wherein the sealing element bears against a support region of the airbag module.

8. The airbag module as claimed in claim 7, wherein the support region of the airbag module is substantially dimensionally stable.

9. The airbag module as claimed in claim 8, wherein the sealing element is elastically pretensioned against the support region.

10. The airbag module as claimed in claim 7, wherein the sealing element presses the edge of the opening of the protective covering against the support region of the airbag module.

11. The airbag module as claimed in claim 1, wherein the component of the airbag module is configured as a gas generator for inflating the airbag.

12. The airbag module as claimed in claim 11, wherein the first component part of the component configured as a gas generator is configured as a generator body that, when igniting the gas generator, releases gas for inflating the airbag.

13. The airbag module as claimed in claim 12, wherein the second component part of the component configured as a gas generator is configured as an ignition device which may be actuated for igniting the gas generator.

14. The airbag module as claimed in claim 13, wherein the airbag encloses the gas generator so that the generator body is arranged inside the airbag.

15. The airbag module as claimed in claim 13, wherein the ignition device projects through an opening of the airbag.

16. The airbag module as claimed in claim 13, wherein the ignition device projects in the radial direction from the generator body.

17. The airbag module as claimed in claim 13, wherein the ignition device projects in the axial direction from at least one front face of the generator body.

18. The airbag module as claimed in claim 13, wherein the ignition device comprises an igniter and an ignition cable for igniting the igniter.

19. The airbag module as claimed in claim 12, wherein the gas generator is configured as a tubular gas generator with a tubular generator body.

20. The airbag module as claimed in claim 11, wherein a support region is configured on the gas generator.

21. The airbag module as claimed in claim 20, wherein the support region is configured on the generator body.

22. The airbag module as claimed in claim 20, wherein the support region is configured on an igniter of an ignition device.

23. The airbag module as claimed in claim 22, wherein the sealing element engages around a part of the ignition device.

24. The airbag module as claimed in claim 1, wherein the protective covering is configured at least partially as a flexible protective covering.

25. The airbag module as claimed in claim 24, wherein the protective covering is configured entirely as a flexible protective covering.

26. The airbag module as claimed in claim 24, wherein the protective covering is partially formed by a housing-like covering and partially by a flexible covering.

27. The airbag module as claimed in claim 26, wherein the flexible covering closes a top surface of the housing-like covering.

28. The airbag module as claimed in claim 26, wherein the housing-like covering is configured to be elastically deformable.

29. The airbag module as claimed in claim 24, wherein the flexible components of the protective covering are configured as protective films.

30. The airbag module as claimed in claim 29, wherein a module housing is provided which at least partially surrounds the airbag, the component and the flexible protective covering.

31. The airbag module as claimed in claim 30, wherein an ignition device projects through an opening of the module housing out of the space surrounded by the module housing.

32. The airbag module as claimed in claim 30, wherein the sealing element is arranged on the module housing.

33. The airbag module as claimed in claim 24, wherein the opening is configured in a flexible component of the protective covering.

34. The airbag module as claimed in claim 1, wherein the component of the airbag module cooperating with the airbag is configured as a fastening mechanism to secure the airbag to a support of the airbag module.

35. The airbag module as claimed in claim 34, wherein the component configured as a fastening mechanism is connected via the first component part to the airbag.

36. The airbag module as claimed in claim 34, wherein the second component part of the component configured as a fastening mechanism secures the fastening mechanism to a support of the airbag module.

37. The airbag module as claimed in claims 34, wherein the first component part and the second component part of the fastening mechanism are connected integrally to one another.

38. The airbag module as claimed in claim 34, wherein the second component part of the fastening mechanism projects from the first component part of the fastening mechanism, in particular in the form of at least one pin.

39. The airbag module as claimed in claim 38, wherein the at least one pin, for securing the airbag package to a support of the airbag package, comprises an external thread.

40. The airbag module as claimed in claim 34, wherein the sealing element surrounds the second component part of the fastening mechanism in cross section.

41. The airbag module as claimed in claim 34, wherein the second component part of the fastening mechanism is extended longitudinally in a direction of extension.

42. The airbag module as claimed in claim 41, wherein:
the airbag comprises at least one through-opening aligned with the opening of the protective covering;
the airbag comprises a first edge region surrounding the through-opening; and
the protecting covering comprises a second edge region surrounding the opening of the protecting covering;
the first component part of the fastening mechanism comprises a bearing region that bears against the airbag at the first edge region of the airbag surrounding the through-opening; and
the second component part of the fastening mechanism is passed in the direction of extension through the through-opening of the airbag so that the first edge region of the airbag is arranged in the direction of extension between the bearing region and the second edge region of the protective covering.

43. The airbag module as claimed in claim 42, wherein the sealing element for sealing the opening presses the second edge region of the protective covering in the direction of extension against the bearing region of the first component part.

44. The airbag module as claimed in claim 43, wherein the sealing element for scaling the opening of the protective covering presses the second edge region of the protective covering together with the first edge region of the airbag in the direction of extension against the bearing region of the first component part.

45. The airbag module as claimed in claim 44, wherein the sealing element has a hollow cylindrical body surrounding the second component part of the fastening mechanism in cross section.

46. The airbag module as claimed in claim 45, wherein the hollow cylindrical body comprises a casing bearing against the second component part and surrounding the second component part in cross section, from which a flange surrounding the casing projects transversely to the direction of extension, with a first face facing the second edge region of the protective covering.

47. The airbag module as claimed in claim 46, wherein the flange for sealing the opening presses the protective covering with its first face in the direction of extension against the second edge region of the protective covering.

48. The airbag module as claimed in claim 46, wherein, for sealing the opening, the sealing element comprises a bearing element arranged in the direction of extension between the first face and the second edge region of the protective covering, which sealingly bears against the second edge region of the protective covering and the first face.

49. The airbag module as claimed in claim 48, wherein the bearing element is configured as a flexible sealing ring that engages around the second component part of the fastening mechanism in cross section.

50. The airbag module as claimed in claim 42, wherein the bearing region bears against a third edge region of the airbag bordering an inlet opening of the airbag, so that the third edge region of the airbag is arranged in the direction of extension between the bearing region and the protective covering.

51. The airbag module as claimed in claim 50, wherein the through-opening is configured on the third edge region.

52. The airbag module as claimed in claim 51, wherein the first component part of the fastening mechanism comprises a diffuser which projects from the bearing region into the interior of the airbag.

53. The airbag module as claimed in claim 52, wherein the second component part of the fastening mechanism is formed by a plurality of pins projecting in the direction of extension from the bearing region, which are passed through a corresponding plurality of through-openings of the airbag and openings of the protective covering aligned with the through-openings and project from the space surrounded by the protective covering and in that the openings are closed in a gastight manner by a corresponding plurality of sealing elements.

54. The airbag module as claimed in claim 41 comprising a second edge region of the protective covering surrounding the opening, wherein the sealing element for sealing the opening of the protective covering presses the second edge region of the protective covering transversely to the direction of extension against the second component part of the fastening mechanism.

55. The airbag module as claimed in claim 54, wherein the sealing element is configured as a flexible tube, a heat-shrinkable tube, or as a flexible O-ring.

56. The airbag module as claimed in claim 41 comprising a second edge region of the protective covering surrounding the opening, wherein the sealing element for sealing the opening in a gastight manner is pretensioned in the direction of extension against the second edge region of the protective covering.

57. The airbag module as claimed in claim 41, wherein the sealing element for sealing the opening in a gastight manner is pretensioned transversely to the direction of extension against the second component part of the fastening mechanism.

58. The airbag module as claimed in claim 41, wherein a spring element pretensions the sealing element.

59. The airbag module as claimed in claim 34, wherein the first component part of the fastening mechanism is arranged in an interior of the airbag surrounded by the airbag.

60. The airbag module as claimed in claim 34, wherein the first component part of the fastening mechanism comprises a bearing region that bears against the airbag.

61. The airbag module as claimed in claim 60, comprising a second edge region of the protective covering surrounding the opening, wherein the sealing element is configured as a coating of the bearing region surrounding the second component part in cross section, to which the second edge region surrounding the opening of the protective covering is connected so that the opening of the protective covering is sealed in a gastight manner.

62. The airbag module as claimed in claim 60, wherein the hearing region is configured as a flat ring.

63. The airbag module as claimed in claim 34, wherein at least one through-opening of the airbag is provided and in that the at least one through-opening is aligned with the opening of the protective covering.

64. The airbag module as claimed in claim 63, wherein a first edge region of the airbag surrounds the through-opening.

65. The airbag module as claimed in claim 64, wherein a second edge region of the protective covering surrounds the opening.

66. The airbag module as claimed in claim 65, wherein the scaling element is formed by the second edge region of the protective covering surrounding the opening, and presses against the second component part of the fastening mechanism when generating a vacuum in the space of the protective covering, so that the opening of the protective covering is sealed in a gastight manner.

67. The airbag module as claimed in claim 65, wherein the sealing element is configured as a coating of the second component part surrounding the second component part of the fastening mechanism in cross section, which connects the second edge region to the second component part in a gastight manner.

68. The airbag module as claimed in claim 67, wherein the coating is provided and designed to be connected in a gastight manner to the second edge region of the protective covering by heating.

69. The airbag module as claimed in claim 67, wherein the coating may be activated mechanically, so that the coating, in particular by pressing the second edge region of the protective covering against the coating, may be connected in a gastight manner to the second edge region of the protective covering.

70. The airbag module as claimed in claim 65, wherein the sealing element comprises a disk element for compensating for unevenness of the airbag.

71. The airbag module as claimed in claim 70, wherein the disk element surrounds the second component part of the fastening mechanism in cross section in an annular manner.

72. The airbag module as claimed in claim 70, wherein the disk element is arranged in the direction of extension between the second edge region of the protective covering and the first edge region of the airbag.

73. The airbag module as claimed in claim 65, wherein the sealing element comprises an additional, deformable sealing mass and a disk element, wherein the sealing mass is arranged at least partially in the direction of extension between the disk element and the second edge region of the protective covering.

74. The airbag module as claimed in claim 65, wherein the sealing element comprises an additional, deformable sealing mass and a disk element, wherein the sealing mass is arranged at least partially in the direction of extension between the disk element and the first edge region of the airbag.

75. The airbag module as claimed in claim 34, wherein the sealing element comprises an additional, deformable sealing mass.

76. The airbag module as claimed in claim 75, comprising a second edge region of the protective covering surrounding the opening, wherein the sealing mass is arranged between the sealing element and the second edge region of the protective covering.

77. The airbag module as claimed in claim 76, wherein the sealing mass is at least partially arranged between the second edge region of the protective covering and a first edge region of the airbag.

78. The airbag module as claimed in claim 77, wherein the sealing mass bears against the second component part of the fastening mechanism.

\* \* \* \* \*

UNITED STATES PATENT AND TRADEMARK OFFICE
CERTIFICATE OF CORRECTION

| | | |
|---|---|---|
| PATENT NO. | : 7,780,188 B2 | Page 1 of 1 |
| APPLICATION NO. | : 12/010069 | |
| DATED | : August 24, 2010 | |
| INVENTOR(S) | : Nick Eckert et al. | |

It is certified that error appears in the above-identified patent and that said Letters Patent is hereby corrected as shown below:

Col. 20, claim 44, line 2, "scaling" should be --sealing--.
Col. 21, claim 56, line 3, "scaling" should be --sealing--.
Col. 21, claim 62, line 2, "hearing" should be --bearing--.

Signed and Sealed this
Twenty-ninth Day of November, 2011

David J. Kappos
*Director of the United States Patent and Trademark Office*